US011221058B2

(12) United States Patent
Romero

(10) Patent No.: US 11,221,058 B2
(45) Date of Patent: Jan. 11, 2022

(54) ADJUSTABLE BUNGEE FASTENER

(71) Applicant: Spectrum Brands, Inc., Middleton, WI (US)

(72) Inventor: Oscar Romero, Lake Forest, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 17/005,690

(22) Filed: Aug. 28, 2020

(65) Prior Publication Data
US 2021/0088108 A1 Mar. 25, 2021

Related U.S. Application Data

(63) Continuation of application No. 16/000,140, filed on Jun. 5, 2018, now Pat. No. 10,767,730.

(60) Provisional application No. 62/576,608, filed on Oct. 24, 2017, provisional application No. 62/515,503, filed on Jun. 5, 2017.

(51) Int. Cl.
*F16G 11/10* (2006.01)
*A44B 11/10* (2006.01)
*F16G 11/04* (2006.01)
*B60P 7/08* (2006.01)

(52) U.S. Cl.
CPC ............ *F16G 11/106* (2013.01); *A44B 11/10* (2013.01); *F16G 11/044* (2013.01); *F16G 11/101* (2013.01); *F16G 11/103* (2013.01); *B60P 7/0823* (2013.01)

(58) Field of Classification Search
CPC ...... A44B 11/10; B60P 7/0823; F16G 11/044; F16G 11/101; F16G 11/103; F16G 11/106
See application file for complete search history.

(56) References Cited

U.S. PATENT DOCUMENTS

| 206,169 A | * | 7/1878 | Fayman | F16G 11/10 24/134 R |
| 2,200,895 A | | 5/1940 | Rio | |
| 2,544,086 A | * | 3/1951 | Herrington | B66D 3/12 24/136 A |

(Continued)

FOREIGN PATENT DOCUMENTS

| DE | 607508 C | 12/1934 |
| EP | 0 629 793 A1 | 12/1994 |
| EP | 2 607 747 A2 | 6/2013 |

OTHER PUBLICATIONS

International Search Report and Written Opinion for Application No. PCT/US2018/036110 dated Sep. 6, 2018.
Fayman, U.S. Pat. No. 206,169 issued Jul. 23, 1878.

*Primary Examiner* — David M Upchurch
(74) *Attorney, Agent, or Firm* — Merchant & Gould P.C.

(57) ABSTRACT

The bungee fastener has a tapered chute that accepts a locking slider. A channel forms an opening in a side of the body thereby allowing passage of the slider through the channel. A plurality of slider teeth along a portion of the slider within the tapered chute may lock onto a bungee when the slider is slid into a locked position. The slider moves along the channel, thereby selectively narrowing the tapered chute with the slider teeth as the slider is slid into the locked position and enlarging the tapered chute as the slider is slid into the unlocked position. The bungee fastener may include a single slider or a plurality of sliders.

20 Claims, 21 Drawing Sheets

(56) References Cited

U.S. PATENT DOCUMENTS

| | | | | |
|---|---|---|---|---|
| 3,215,395 | A | * | 11/1965 | Gorbar ............... A61M 39/286 |
| | | | | 251/6 |
| 4,102,019 | A | * | 7/1978 | Boden .................... A43C 7/00 |
| | | | | 24/136 R |
| 4,406,440 | A | * | 9/1983 | Kulle ................. A61M 39/286 |
| | | | | 251/6 |
| 4,807,333 | A | * | 2/1989 | Boden ..................... A43C 7/08 |
| | | | | 24/136 R |
| 4,998,327 | A | * | 3/1991 | Hull .................... F16G 11/106 |
| | | | | 24/132 WL |
| 5,454,140 | A | * | 10/1995 | Murai .................. F16G 11/101 |
| | | | | 24/136 R |
| 6,185,798 | B1 | | 2/2001 | Ton |
| 6,457,214 | B1 | * | 10/2002 | Boden ................. F16G 11/101 |
| | | | | 24/115 M |
| 6,546,600 | B1 | | 4/2003 | Lyons |
| 6,775,928 | B2 | | 8/2004 | Grande et al. |
| 6,889,407 | B2 | * | 5/2005 | Martin .................... A43C 7/00 |
| | | | | 24/136 R |
| 6,892,429 | B2 | * | 5/2005 | Sartor .................... A43C 7/04 |
| | | | | 24/132 R |
| 7,770,268 | B2 | | 8/2010 | Breuer |
| 7,878,380 | B2 | | 2/2011 | Bass |
| 8,371,004 | B2 | | 2/2013 | Huber et al. |
| D773,924 | S | | 12/2016 | Ishii |
| 9,647,390 | B1 | | 5/2017 | Creato et al. |
| 2006/0096067 | A1 | * | 5/2006 | Fontaine .............. F16G 11/103 |
| | | | | 24/130 |

* cited by examiner

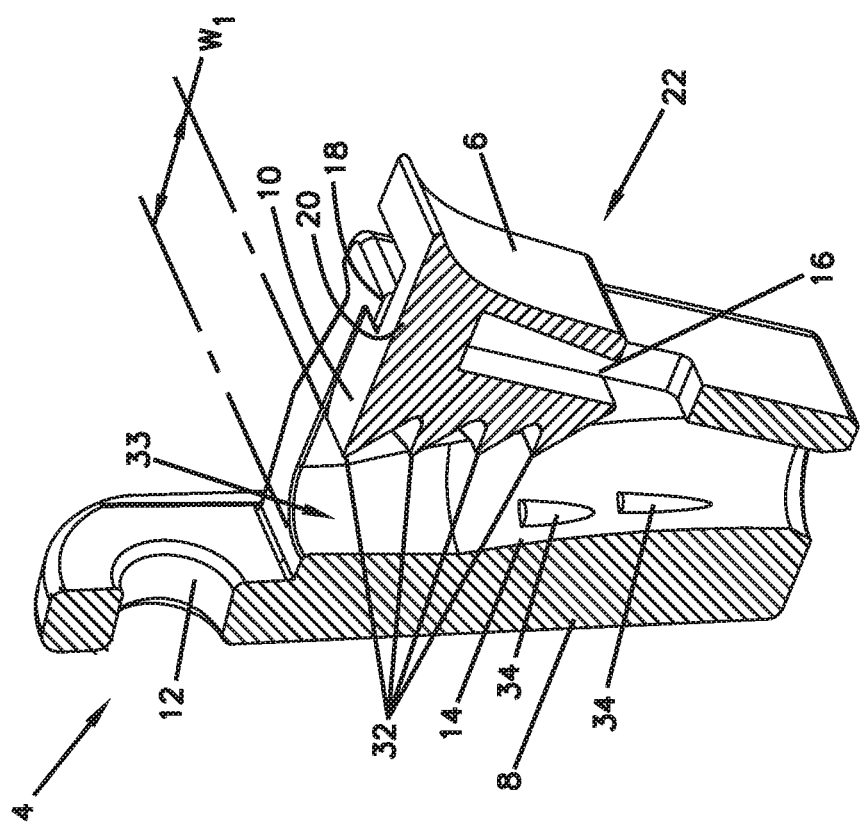
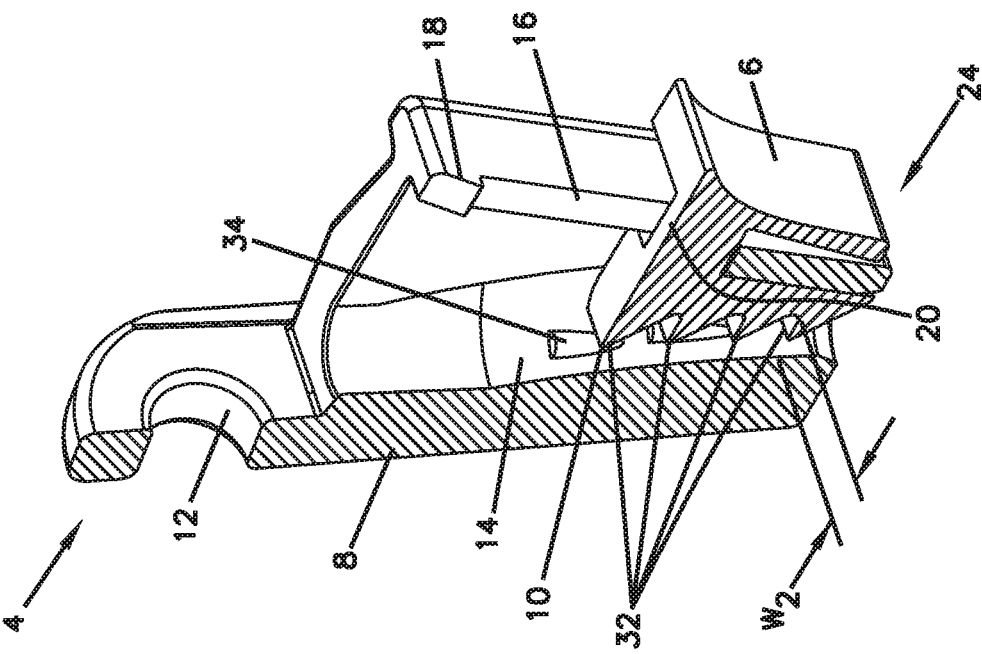

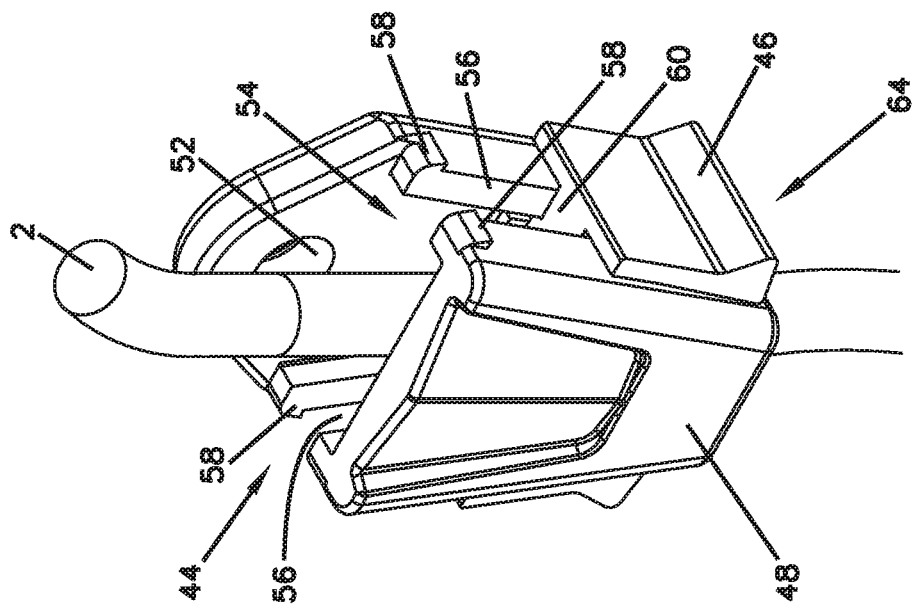
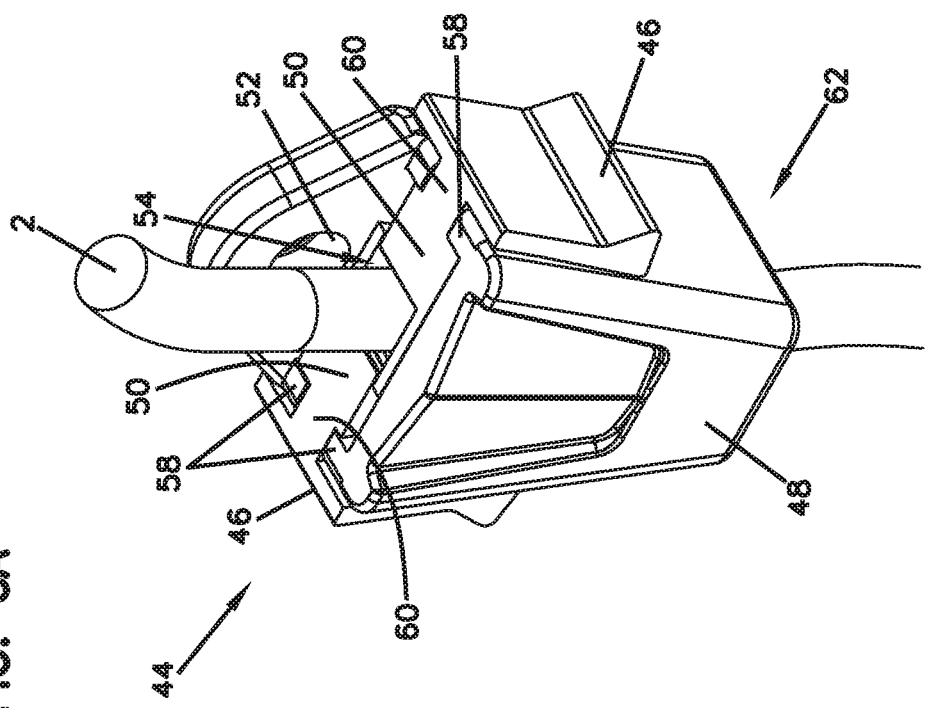

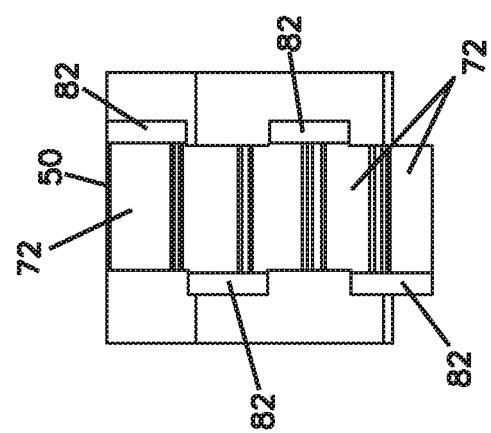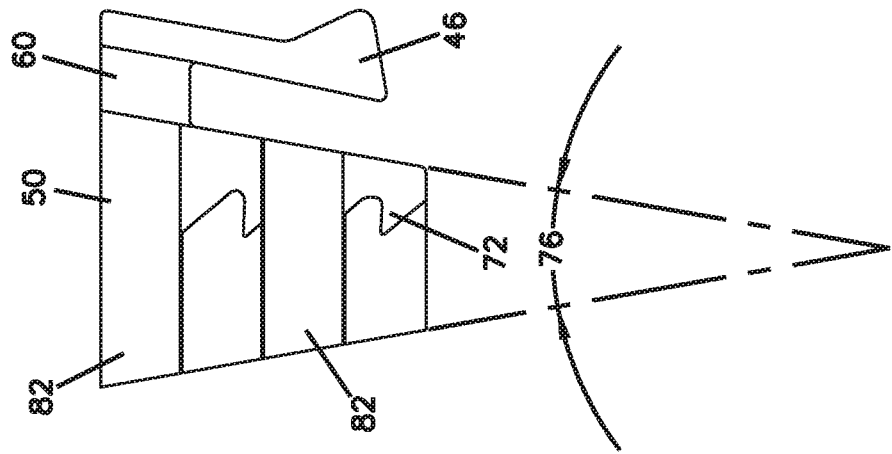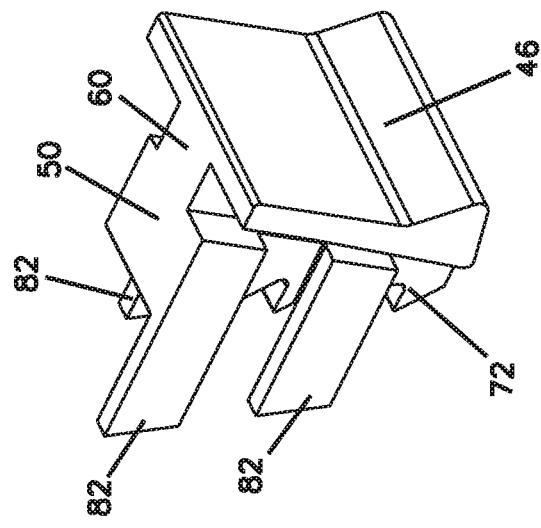

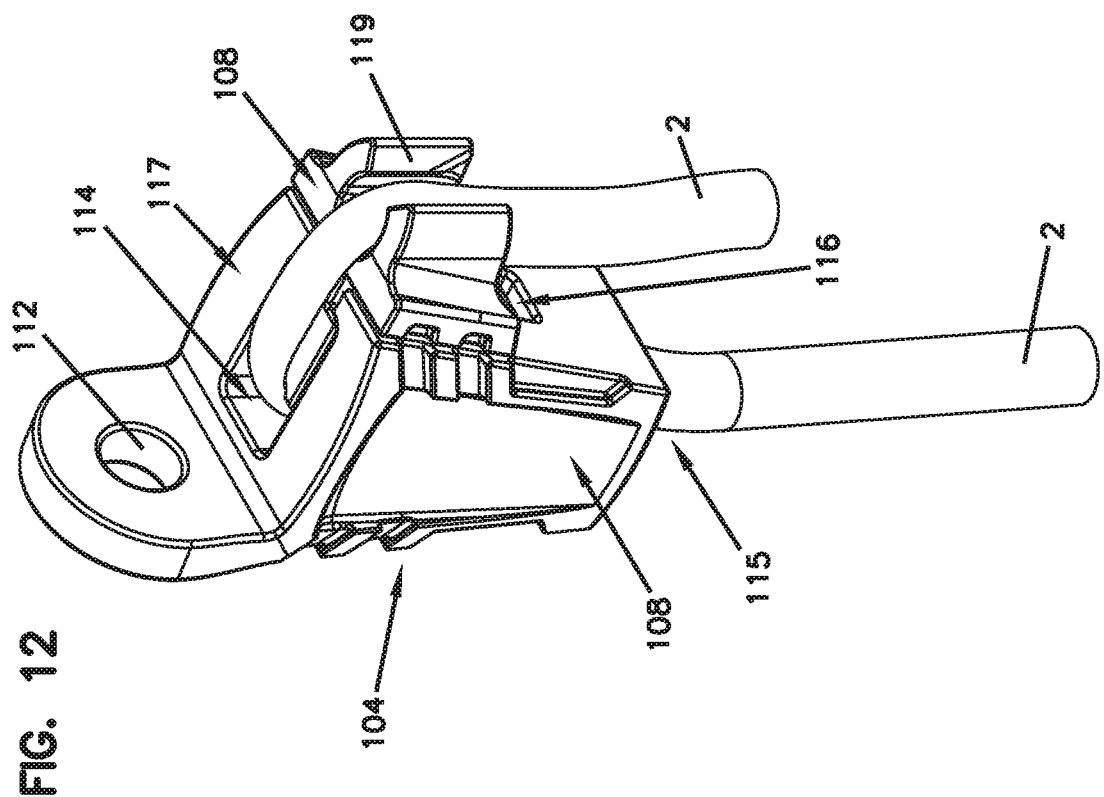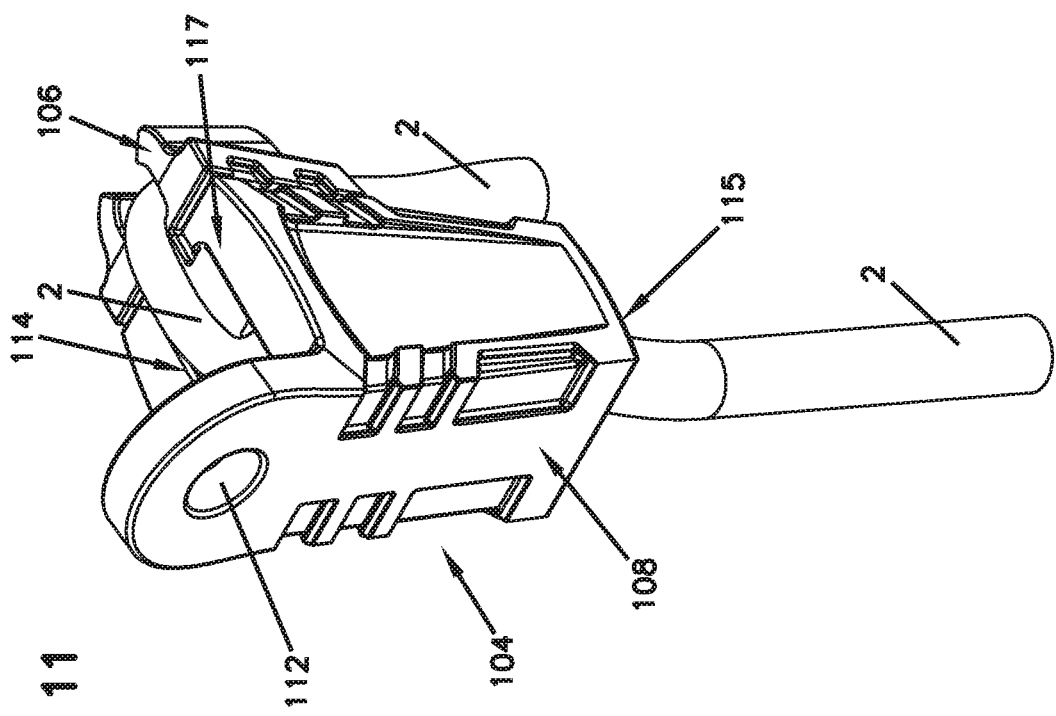

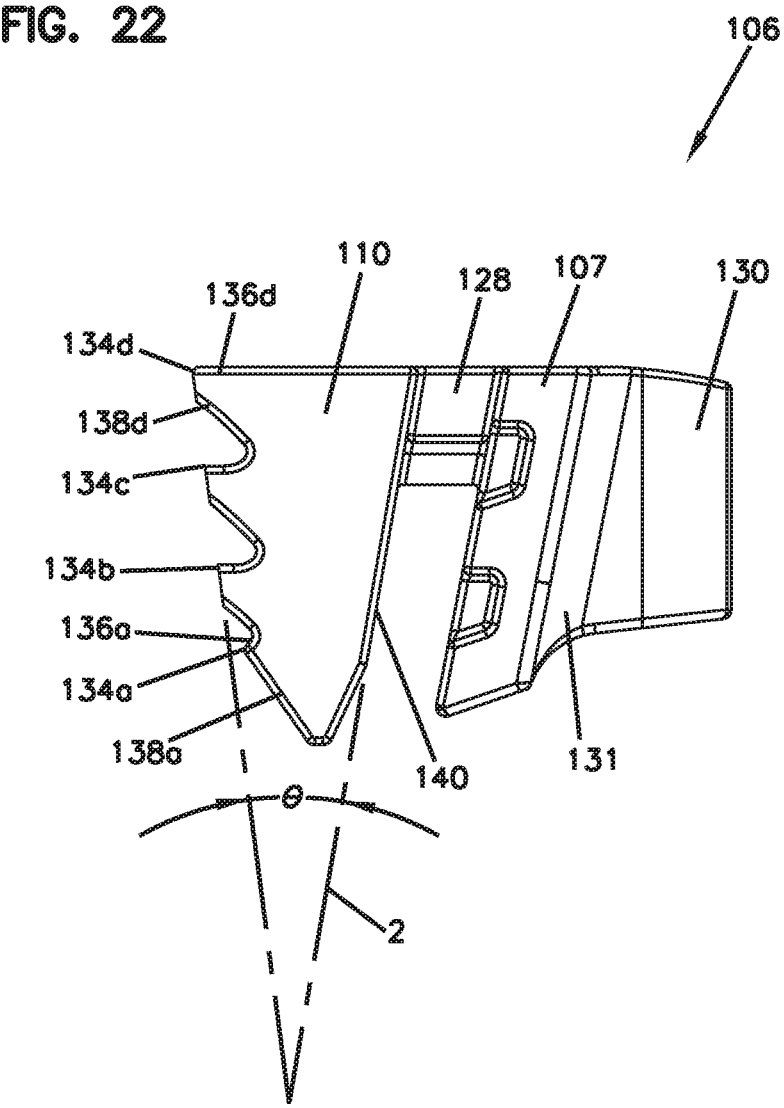

ADJUSTABLE BUNGEE FASTENER

CROSS-REFERENCE TO RELATED APPLICATIONS

The present application is a continuation of U.S. patent application Ser. No. 16/000,140, filed Jun. 5, 2018, now U.S. Pat. No. 10,767,730; which claims the benefit of U.S. Provisional Patent Application No. 62/515,503, filed Jun. 5, 2017; and U.S. Provisional Patent Application No. 62/576,608, filed Oct. 24, 2017, the disclosures of each application hereby incorporated by reference in their entirety.

TECHNICAL FIELD

The invention is related to the field of adjustable bungee fasteners which allow a user to adjust the position of a bungee fastener on a cord.

BACKGROUND OF THE INVENTION

Ropes, straps, and cords are frequently used to secure cargo. With the varying size of cargo and the varying location of securement points, the ropes, straps, and cords need to be adjustable in length. In the past, this need was met by either cutting the ropes, straps, and cords or simply tying them off.

With the advent of elastic cords, such as bungee cords, users have been able to cover a variety of lengths and securement points with a single length of bungee cord. The elasticity allows the user to stretch the cord length, which also adds to the cord's cargo retention properties.

However, there still exists a need to further improve the bungee cord and provide greater flexibility in the length and securement points. What is also needed is a way to quickly and effortlessly adjust the bungee cord length. Finally, what is needed is a way to infinitely adjust the securement point along the length of the bungee cord without cutting or otherwise damaging the cord.

SUMMARY AND OBJECT OF THE INVENTION

A bungee fastener is hereby disclosed. The bungee fastener includes a body with a tapered chute passing through the body. A slider may slide within the body. A clip extends from the slider by a neck. A channel forms an opening in a side of the body, thereby allowing passage of the neck of the slider through the channel and placing the clip within the tapered chute. A plurality of slider teeth along the clip within the tapered chute may lock onto a bungee within the tapered chute when the slider is slid into a locked position.

The slider is accordingly configured to move along the channel, thereby selectively narrowing the tapered chute with the slider teeth as the slider is slid into the locked position. Similarly, the slider can move along the channel to selectively enlarge the tapered chute as the slider is slid into an unlocked position.

A bungee may be placed into the tapered chute when the slider is in the unlocked position. The bungee fastener may be freely moved along a length of the bungee while the slider is kept in the unlocked position. The bungee fastener can be locked onto the bungee when the slider is slid along the channel into the locked position, thereby narrowing the tapered chute and causing a pressure on the bungee by the slider teeth and the tapered chute against the bungee. The term bungee includes both elastic and non-elastic rope, cords, and wires.

In one example of the present disclosure, a bungee fastener is disclosed. The bungee fastener includes a body that has a top side and an opposite bottom side. The body defines a tapered chute that is configured to receive a cord. The bungee fastener includes a slider at least partially positioned within the tapered chute. The slider is movable relative to the body within the tapered chute between the top side and bottom side of the body. The slider further includes a plurality of teeth positioned within the tapered chute.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based

BRIEF DESCRIPTION OF THE DRAWINGS

The present disclosure will be described hereafter with reference to the attached drawings which are given as non-limiting examples only, in which:

FIG. 3A shows a section view of the bungee fastener of FIG. 1A in an unlocked position;

FIG. 3B shows a section view of the bungee fastener of FIG. 1A in a locked position;

FIG. 6A shows a perspective view of a bungee fastener according to another embodiment of the present disclosure in an unlocked position with a bungee cord;

FIG. 6B shows a perspective view of the bungee fastener of FIG. 6A in a locked position with a bungee cord;

FIG. 9A shows a perspective view of a slider, removed from the bungee fastener of FIG. 6A;

FIG. 9B shows a side view of the slider, removed from the bungee fastener of FIG. 6A;

FIG. 9C shows a front view of the slider, removed from the bungee fastener of FIG. 6A;

FIG. 11 shows a rear perspective view of a bungee fastener, according to one embodiment of the present disclosure, with a bungee cord in an unlocked position;

FIG. 12 shows a front perspective view of the bungee fastener of FIG. 11;

FIG. 22 shows a side view of the slider of FIG. 20;

Figure 1B:
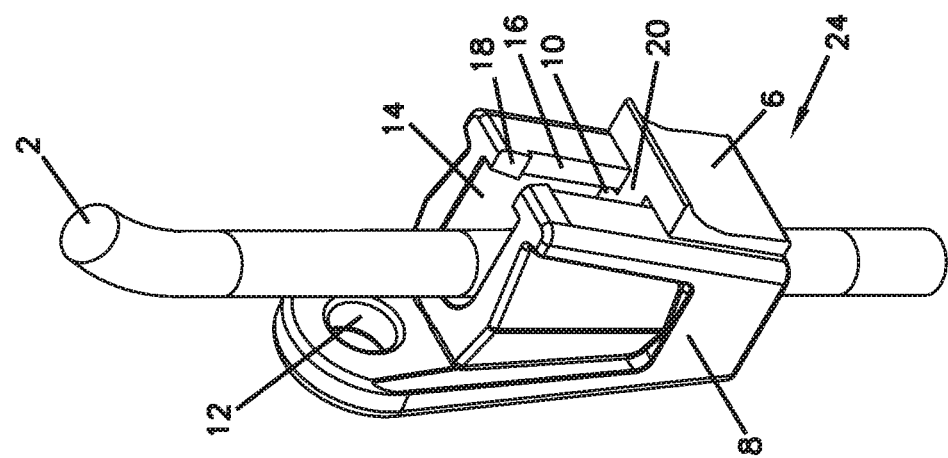
FIG. 1B shows a perspective view of the bungee fastener of FIG. 1A with a bungee cord in a locked position.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Corresponding reference characters in the drawings indicate corresponding parts throughout the several views. The exemplification set out herein illustrates embodiments of the invention, and such exemplification is not to be construed as limiting the scope of the invention in any manner.

DETAILED DESCRIPTION

Figure 1A:
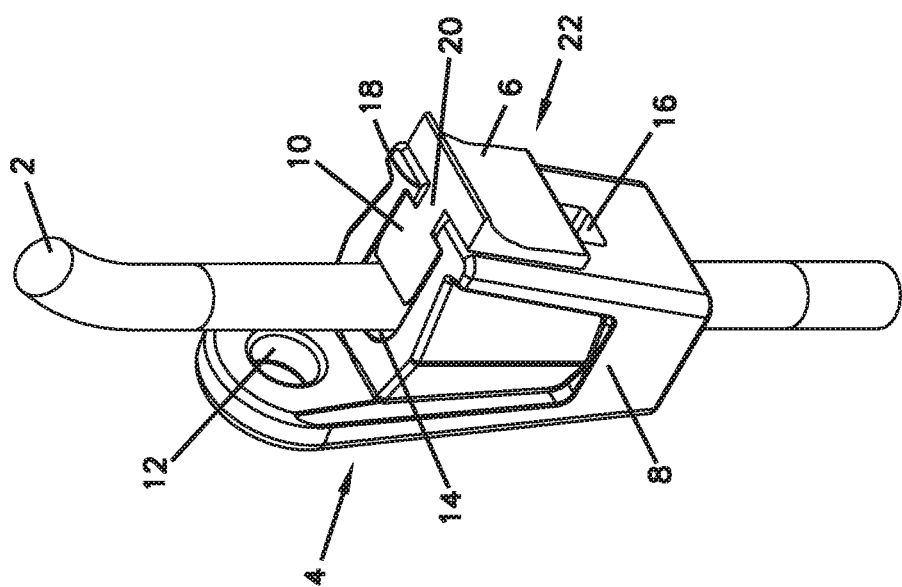
FIG. 1A shows a perspective view of a bungee fastener with a bungee cord in an unlocked position according to one embodiment of the present disclosure.

FIGS. 1A and 1B show the bungee fastener 4 with a bungee 2 (i.e., cord) passed through a tapered chute 14. The bungee fastener 4 is a two-piece design with a body 8 and a slider 6. The slider may slide along a channel 16 in the body 8. The channel 16 forms an opening in the side of the body 8 with a throat 18. The throat 18 is narrower than the channel 16 which prevents the slider 6 from coming out of the channel 16.

In some examples, the bungee 2 can be of any type of cord. In some examples, the bungee is an elastic bungee. In other examples, the bungee 2 is a rope. The bungee fastener 4 allows the bungee 2 (i.e., cord) to be nonpermanently shortened in a secure manner.

The slider 6 includes a neck 20 that fits within the channel 16 and is joined to a clip 10. The clip 10 extends into the tapered chute 14 and applies pressure to the bungee 2 as the slider 6 is slid down the channel 16. For example, FIG. 1A shows the slider 6 in an unlocked position 22, which places the slider 6 proximate the throat 18 within the channel 16. When the slider 6 is in the unlocked position 22, the clip 10 may slightly contact the bungee 2, which allows the bungee 2 to be pulled through the tapered chute 14 and only requires slight adjustment of the slider 6 to lock the bungee fastener 4 into position. This allows the user to place the bungee fastener 4 anywhere along the length of the bungee 2, thereby allowing for an infinite amount of adjustability. Once the bungee fastener 4 is in the desired location along the bungee 2, the slider 6 can be slid down along the channel 16 and placed into a locked position 24 as is depicted in FIG. 1B. In the locked position 24, the clip 10 applies pressure to the bungee 2 thereby locking the bungee fastener 4 into position. The bungee fastener 4 may then be secured to a load or attachment point by using the appropriate fastener through an eyelet 12 in the body 8.

Figure 2A:
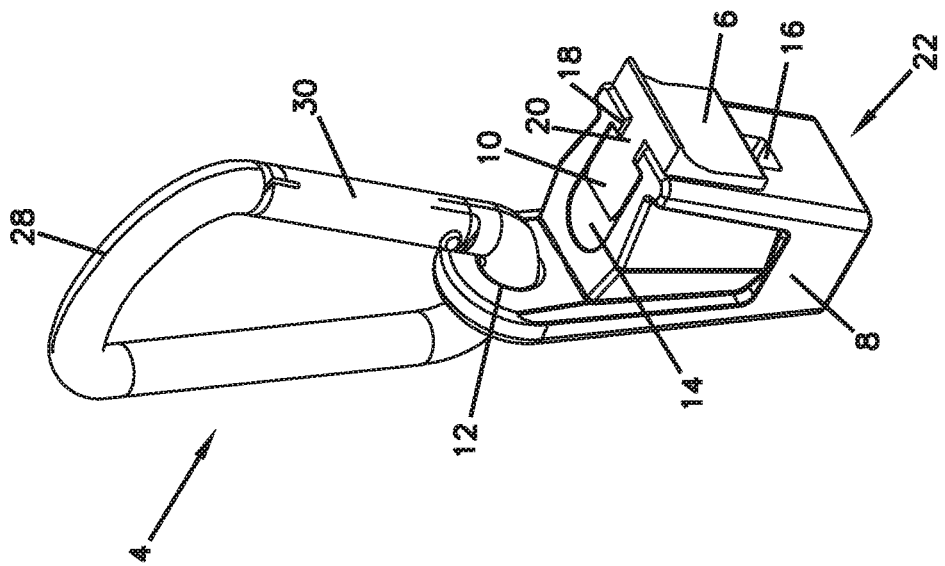
FIG. 2A shows a perspective view of the bungee fastener of FIG. 1A in a locked position with a hook attachment.
Figure 2B:
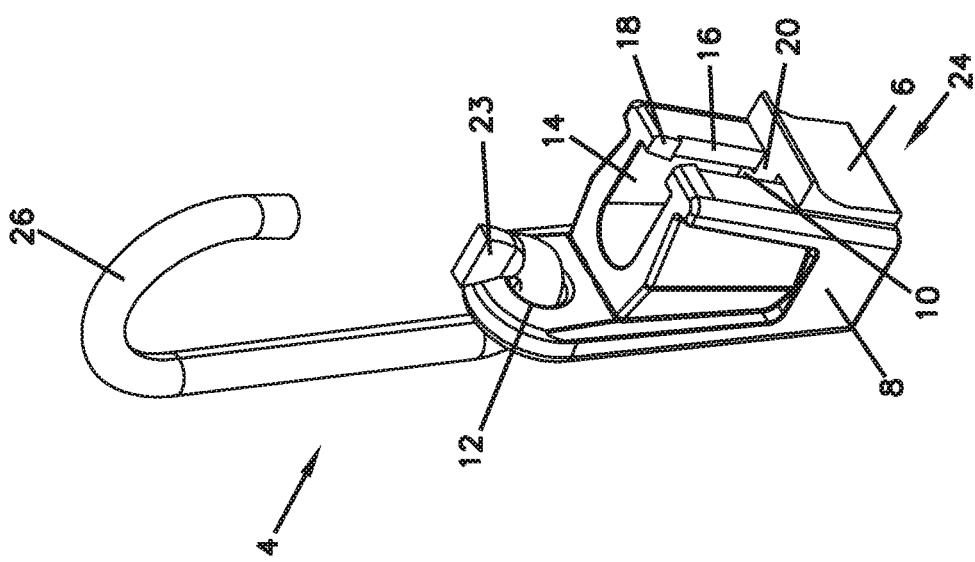
FIG. 2B shows a perspective view of the bungee fastener of FIG. 1A in an unlocked position with a carabiner attachment.

For example, FIGS. 2A and 2B show a hook attachment 26 and a carabiner attachment 28 inserted through the eyelet 12. Any other attachment may be used as well, including a screw, nail, S-hook, or the like. When using a hook attachment 26, a hook 23 may be passed through the eyelet 12. When using a carabiner attachment 28, a clasp 30 may be opened and inserted through the eyelet 12.

The tapered chute 14 works in conjunction with the clip 10 of the slider 6 as best shown in FIGS. 3A and 3B. The clip 10 includes slider teeth 32 that form a serrated edge along the length of the clip 10. The slider teeth 32 are formed with the serrations pointing upwards, toward a top side 33 of the tapered chute 14, thereby gripping the bungee as it is pulled into the tapered chute 14. The tapered chute 14 may also include tapered chute teeth 34 that assist in locking the bungee fastener 4 into position on the bungee. Also, the tapered chute 14 is tapered in width as the chute 14 extends from the top side 33 to a bottom side 35, which allows the slider teeth 32 to close off the opening as the slider 6 is slid down the channel 16. As shown in FIG. 3B, the slider 6 is in the locked position 24, which makes the width tapered chute 14 significantly smaller. When in the unlocked position 22, as shown in FIG. 3A, the bungee can pass through the body 8 within the tapered chute 14, with minimal interference from the tapered chute teeth 34. Specifically, the tapered chute 14 has a width W1 between the teeth 32 and the chute 14. Such a width W1 is equal to or greater than a width of the bungee 2. Once the bungee fastener 4 is in the desired location along the bungee, the slider 6 is moved into the locked position 24, which causes the tapered chute teeth 34 and the slider teeth 32 to exert pressure on opposing sides of the bungee thereby locking the bungee fastener 4 into position. When in the locked position, the chute 14 has a width W2 between the teeth and the chute 14. In some examples, the width W2 is less than or equal to the width of the bungee 2. In some examples, the width W1 is greater than the width W2. In order to release the bungee, the slider 6 may be slid back to the unlocked position and the bungee fastener 4 is free to slide along the bungee.

Figure 4A:
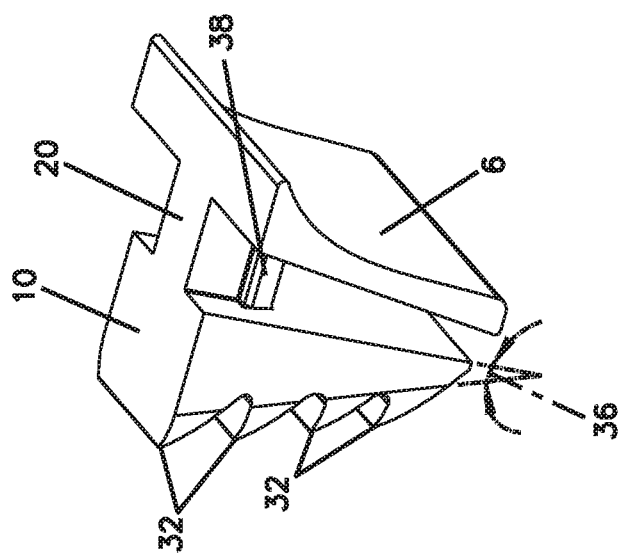
FIG. 4A shows a perspective view of a slider, removed from the bungee fastener of FIG. 1A.
Figure 4B:
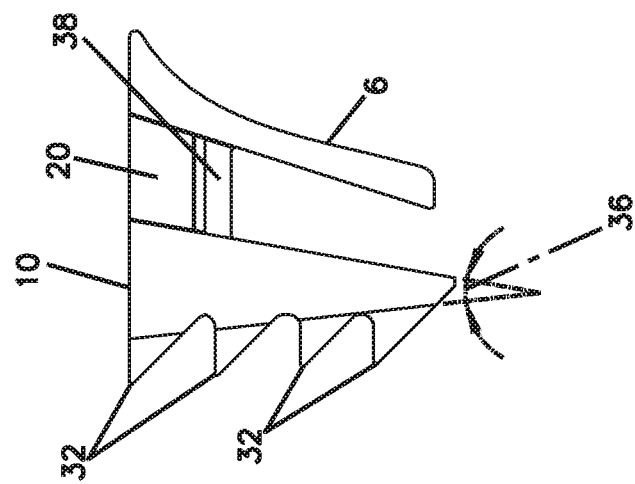
FIG. 4B shows a side view of the slider, removed from the bungee fastener of FIG. 1A.
Figure 4C:
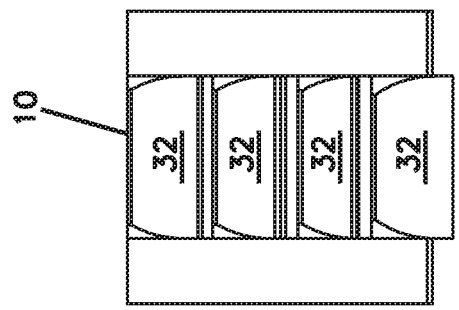
FIG. 4C shows a front view of the slider, removed from the bungee fastener of FIG. 1A.

FIGS. 4A, 4B, and 4C each show different views of the slider 6. The neck 20 is shown with a stop 38. The stop 38 contacts the throat 18 of the channel 16 in the body 8 of the bungee fastener 4 (see FIGS. 3A and 3B for example). The stop 38 therefore prevents the slider 6 from coming out of the channel 16. The slider teeth 32 are shown as serrations, but any other geometry may be used. The slider teeth 32 are formed along the clip 10 with a tapered clip angle 36. The tapered clip angle allows some deflection of the clip 10 about the neck 20. As the slider 6 is slid down the channel 16 (see FIGS. 3A and 3B), the tapered clip angle 36 allows the slider teeth to better dig into the bungee 2 and positively lock the bungee fastener 4 into position.

Figure 5C:
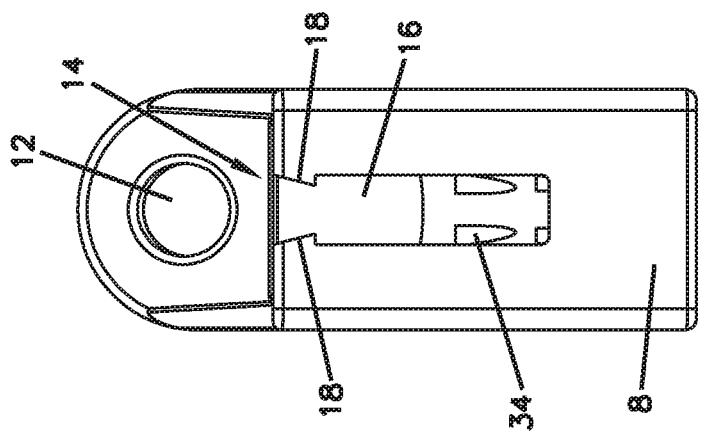
FIG. 5C shows a front view of the body, removed from the bungee fastener of FIG. 1A.
Figure 5B:
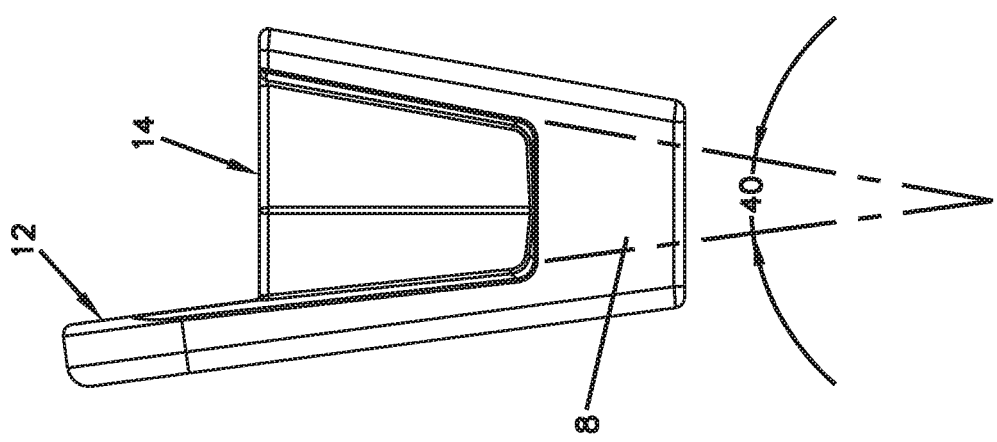
FIG. 5B shows a side view of the body, removed from the bungee fastener of FIG. 1A.
Figure 5A:
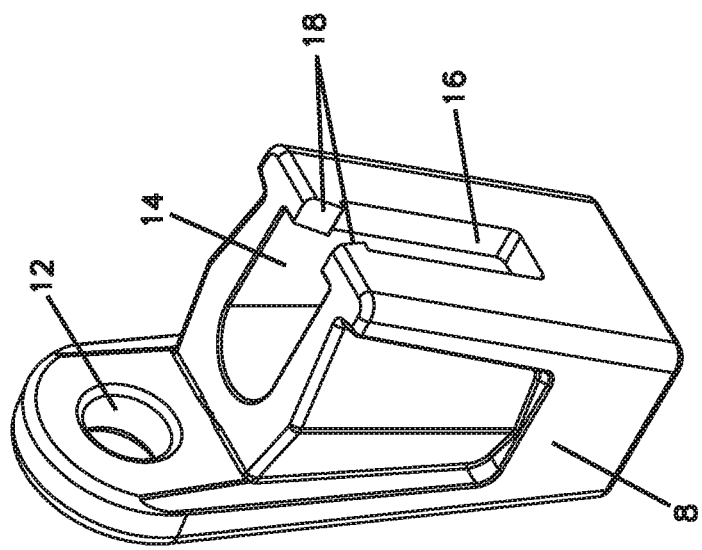
FIG. 5A shows a perspective view of a body, removed from the bungee fastener of FIG. 1A.

FIGS. 5A, 5B, and 5C show various views of the body 8 of the bungee fastener 4. A tapered chute angle 40 is shown in FIG. 5B and represents how the tapered chute 14 forms a taper that works in conjunction with the clip 10 on the slider 6 to pinch the bungee 2. Also best shown in FIG. 5C is the throat 18 which extends into the channel 16. As previously discussed, the throat 18 contacts the stop 38 (best shown in FIG. 4A) to prevent the slider 6 from being removed from the channel 16.

An alternate embodiment of a bungee fastener 44 is shown in FIGS. 6A and 6B. FIG. 6A shows sliders 46 in an unlocked position 62, while FIG. 6B shows the sliders 46 in a locked position 64. This alternate bungee fastener 44 includes dual sliders 46 on opposing sides of a tapered chute 54. This design provides two clips 50 within the tapered chute 54. A body 48 of the bungee fastener 44 includes the tapered chute 54 that is symmetrically formed with dual, matching tapers that allow each slider 46 to move within a channel 56. Just like the previously disclosed embodiment, the slider 46 includes a neck 60 that slides within the channel 56. A throat 58 also extends away from the tapered chute 54 and contacts the sliders 46 directly, thereby preventing them from exiting the channel 56.

Figure 7A:
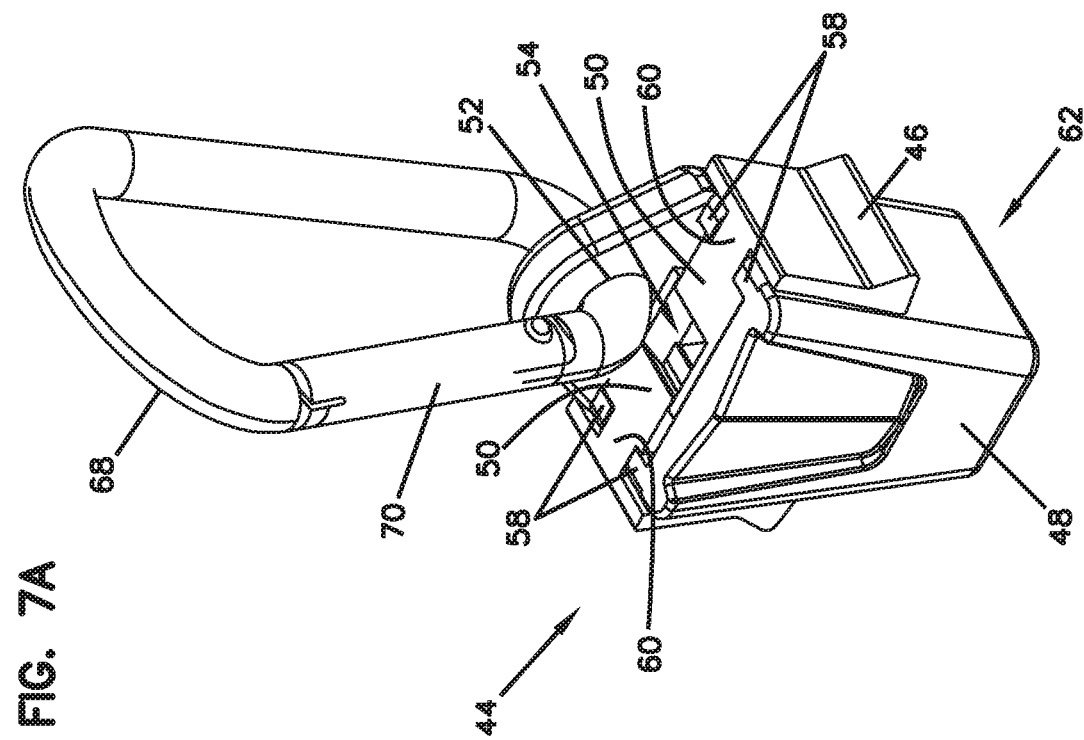
FIG. 7A shows a perspective view of the bungee fastener of FIG. 6A in an unlocked position with a carabiner attachment.
Figure 7B:
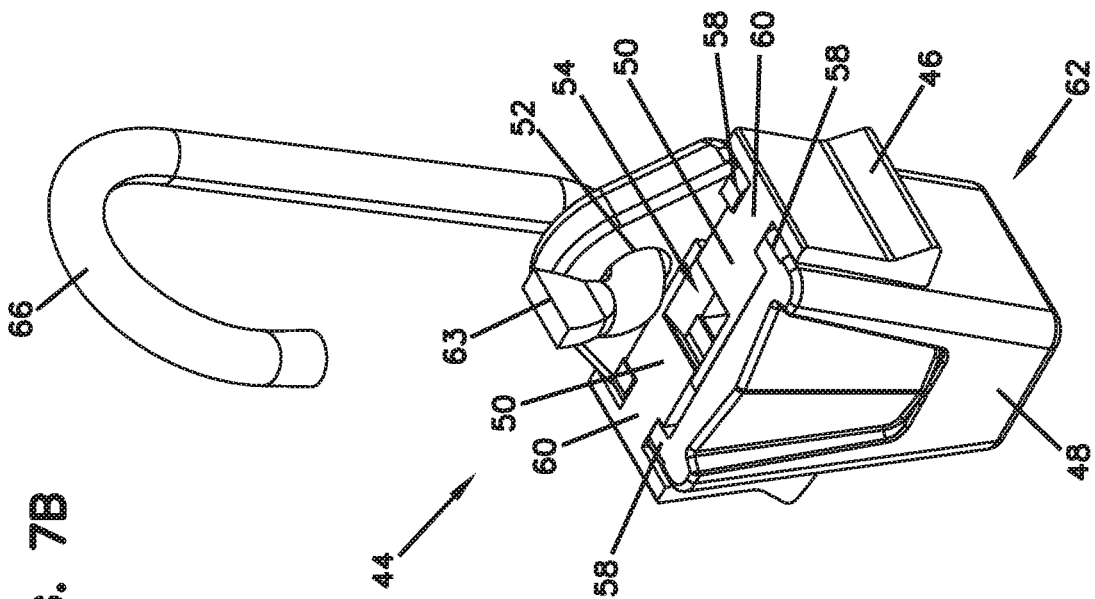
FIG. 7B shows a perspective view of the bungee fastener of FIG. 6A in an unlocked position with a hook attachment.

FIGS. 7A and 7B show the bungee fastener 44 with a carabiner attachment 68 and a hook attachment 66, respectively. A clasp 70 of the carabiner attachment 68 may be opened to allow passage through the eyelet 52 of the bungee fastener 44. Similarly, a hook 63 of the hook attachment 66 may be passed through an eyelet 52 of the bungee fastener 44. Either attachment allows the bungee fastener 44 to be affixed to a securement point.

Figure 8A:
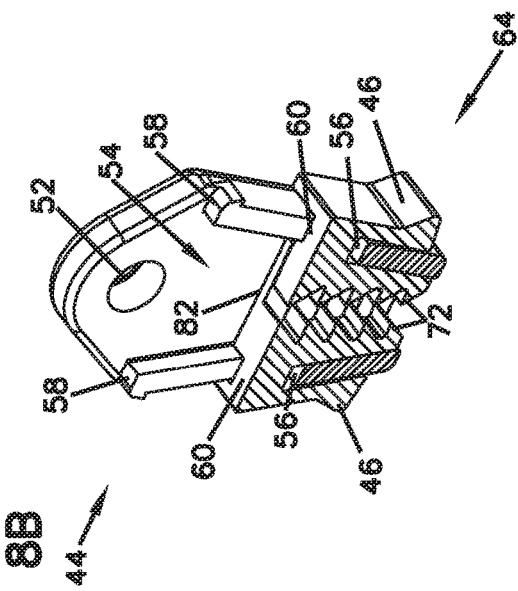
FIG. 8A shows a perspective section view of the bungee fastener of FIG. 6A in an unlocked position.
Figure 8B:
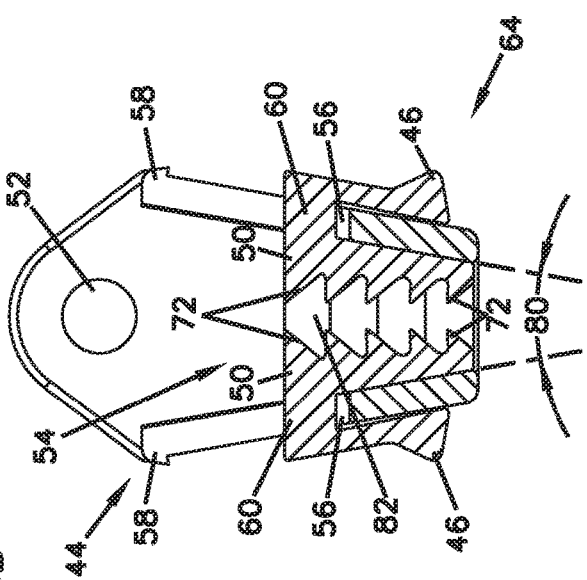
FIG. 8B shows a perspective section view of the bungee fastener of FIG. 6A in a locked position.
Figure 8C:
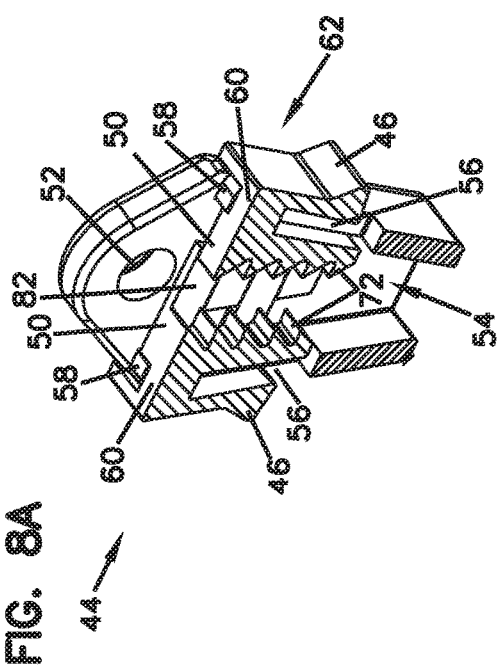
FIG. 8C shows a side section view of the bungee fastener of FIG. 6A in an unlocked position.
Figure 8D:
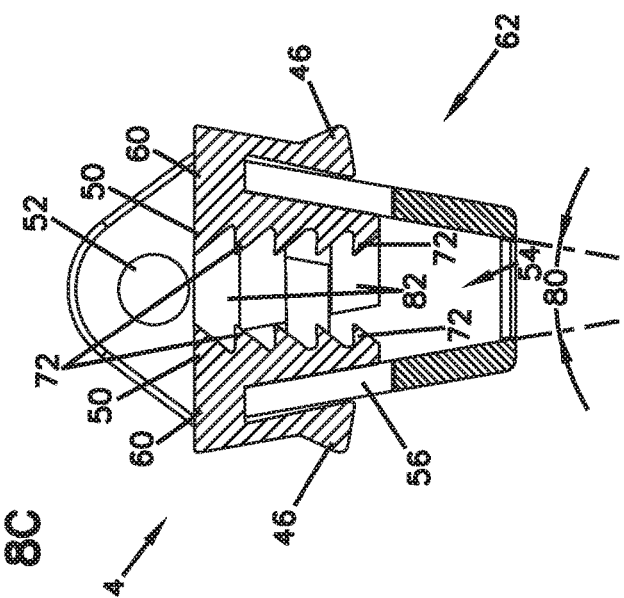
FIG. 8D shows a side section view of the bungee fastener of FIG. 6A in a locked position.

FIGS. 8A, 8B, 8C, and 8D each show a sectional view of the bungee fastener 44 where the section is made along each channel 56. In FIGS. 8A and 8C, the sliders 46 are shown in the unlocked position 62. A tapered chute angle 80 follows the profile of the tapered chute 54 and assists to draw slider teeth 72 closer together as the sliders 46 are drawn down the channel 56. For example, FIG. 8C shows a side view of the bungee fastener 44 with the sliders 46 in the unlocked position 62 and the slider teeth 72 have ample room between them, thereby allowing a bungee 2 to freely pass through the tapered chute 54. While in this position, the bungee 2 may be slid through the bungee fastener 44 may be placed in the desired location along the bungee 2. Once in the desired location, the sliders 46 may be slid down the channel 56 and placed into the locked position 64. As shown in FIG. 8D, the distance between the slider teeth 72 is significantly smaller than shown in FIG. 8C. This is due to the tapered chute angle 80 urging the slider teeth 72 together. Also, the sliders 46 each include arm extensions 82. Each arm extension 82 from each respective slider 46 meshes with the arm extension 82 from the opposing slider 46 within the same tapered chute 54. The meshing of the arm extensions 82 help interlock the movement of the sliders 46 such that they move in tandem as the opposing slider is moved along the respective channel 56.

The arm extensions 82 are better shown in FIGS. 9A, 9B, and 9C where a single slider 46 is shown. FIG. 9C shows how the arm extensions 82 alternate on the sides of the slider teeth 72. An opposing slider 46 would essentially be a mirrored image allowing an arm extension 82 from the opposing slider 46 to fill the gaps on the sides of the slider teeth 72. These sliders 46 do not include a stop on the clip 50. Instead, this alternate embodiment includes the throat 58 on the channel that contacts the sliders 46, as best shown in FIG. 6B, thereby preventing removal of the sliders 46 when sliding them within the channel 56. The sliders 46 also have tapered clip angles 76 which allows the sliders 46 to ride within the tapered chute angle 80 of the tapered chute 54, as best shown in FIGS. 8C and 8D.

Figure 10C:
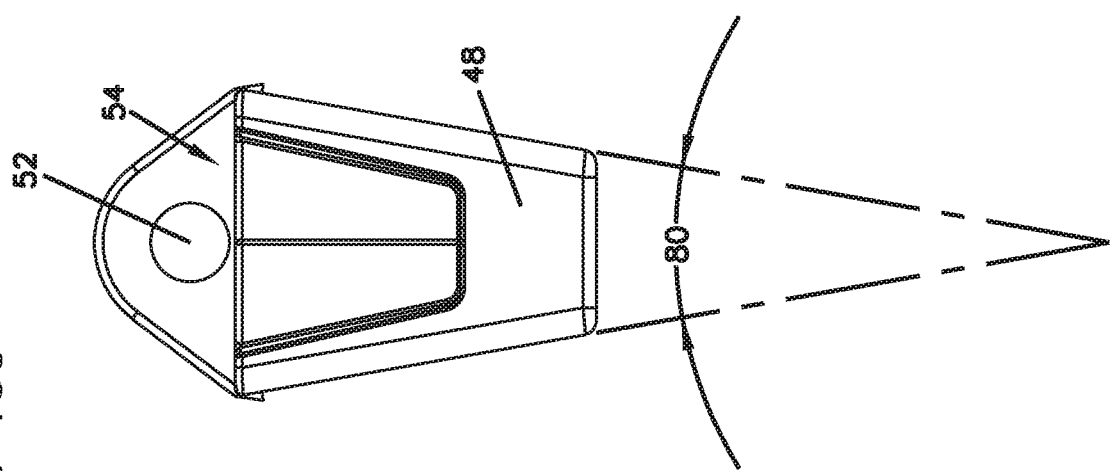
FIG. 10C shows a front view of the body, removed from the bungee fastener of FIG. 6A.
Figure 10B:
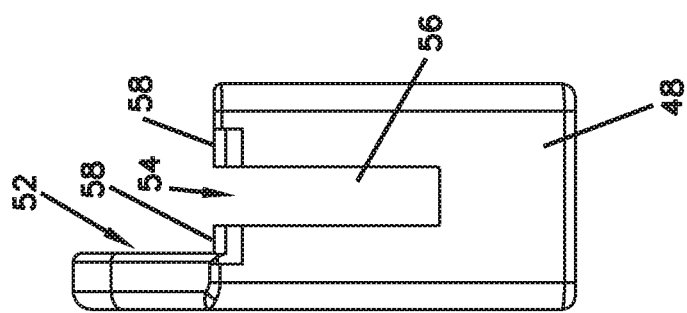
FIG. 10B shows a side view of the body, removed from the bungee fastener of FIG. 6A.
Figure 10A:
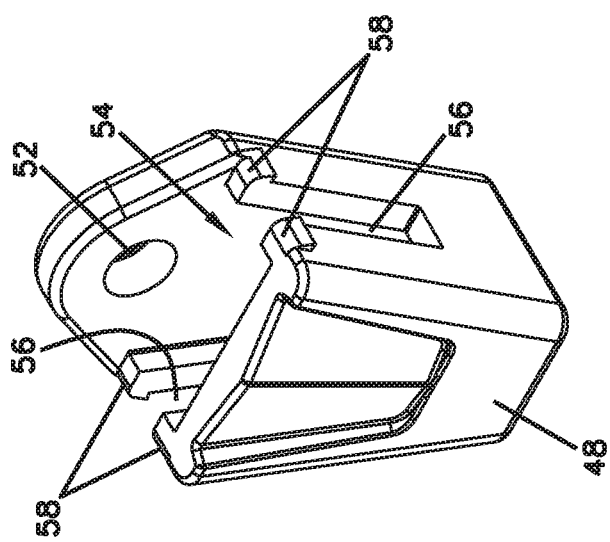
FIG. 10A shows a perspective view of a body, removed from the bungee fastener of FIG. 6A.

FIGS. 10A, 10B, and 10D show perspective, side, and front views of the body 48 of the alternate bungee fastener 44. As previously noted, the channel 56, throat 58, tapered chute 54, and tapered chute angle 80 for each half of the body 48 is a mirrored image on the opposing side of the body 48. This produces a symmetrically shaped body 48, thereby allowing symmetrically shaped sliders 46 to be used as shown in FIGS. 9A, 9B, and 9C.

FIGS. 11-12 show a bungee fastener 104 with a bungee 2 passed through a tapered chute 114. The bungee fastener 104 is substantially similar to the bungee fastener 4 described above.

Like the bungee fastener 4, the bungee fastener 104 is a two-piece design with a body 108 and a slider 106 slidably disposed within a channel 116 in the body 108. The channel 116 includes a throat 118 that is narrower than the channel 116, which prevents the slider 106 from inadvertently being removed from the channel 116. The bungee fastener 104 also includes an eyelet 112 that can be used to attach the bungee fastener 104 to a surface using a fastener (not shown) (e.g., a carbineer, hook, etc.).

As shown, the bungee 2 enters the chute 114 at a bottom side 115 and exits the chute 114 at a top side 117. At the top side 117, the bungee 2 is routed and secured the slider 106 via a fastener 119. In some examples, the fastener is a clip.

Figure 13:
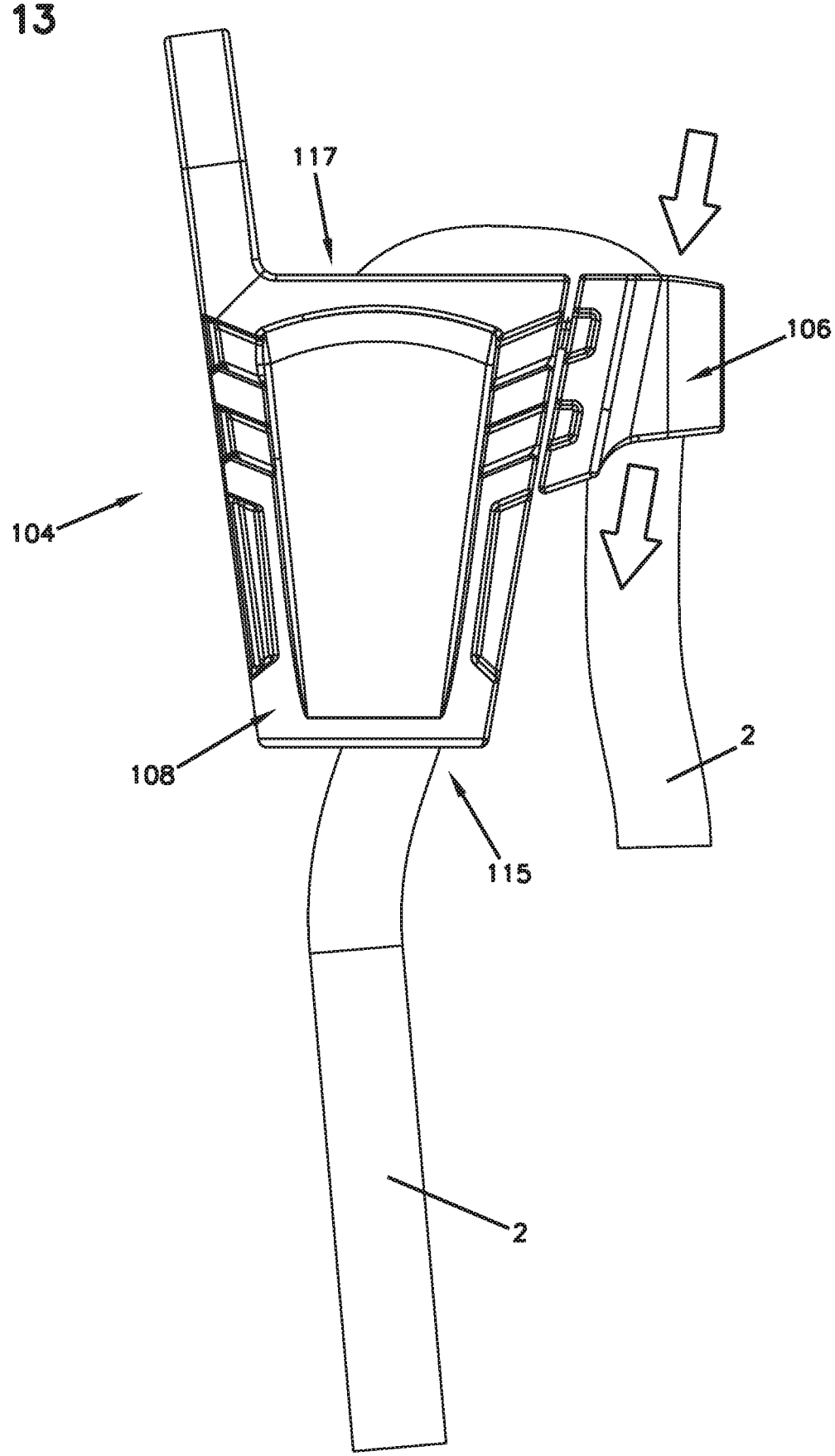
FIG. 13 shows a side view of the bungee fastener of FIG. 11.

FIG. 13 shows a side view of the bungee fastener 104 in an unlocked position. Like the bungee fastener 4 described above, as the slider 106 is moved toward the bottom side 115 of the body 108 (as indicated by arrows), the slider 106 engages the bungee 2 within the chute 114 of the body 108 to prevent relative movement between the bungee fastener 104 and the bungee 2. Once the bungee 2 is secured within the chute 114, the bungee fastener 104 is in a locked position.

Figure 14:
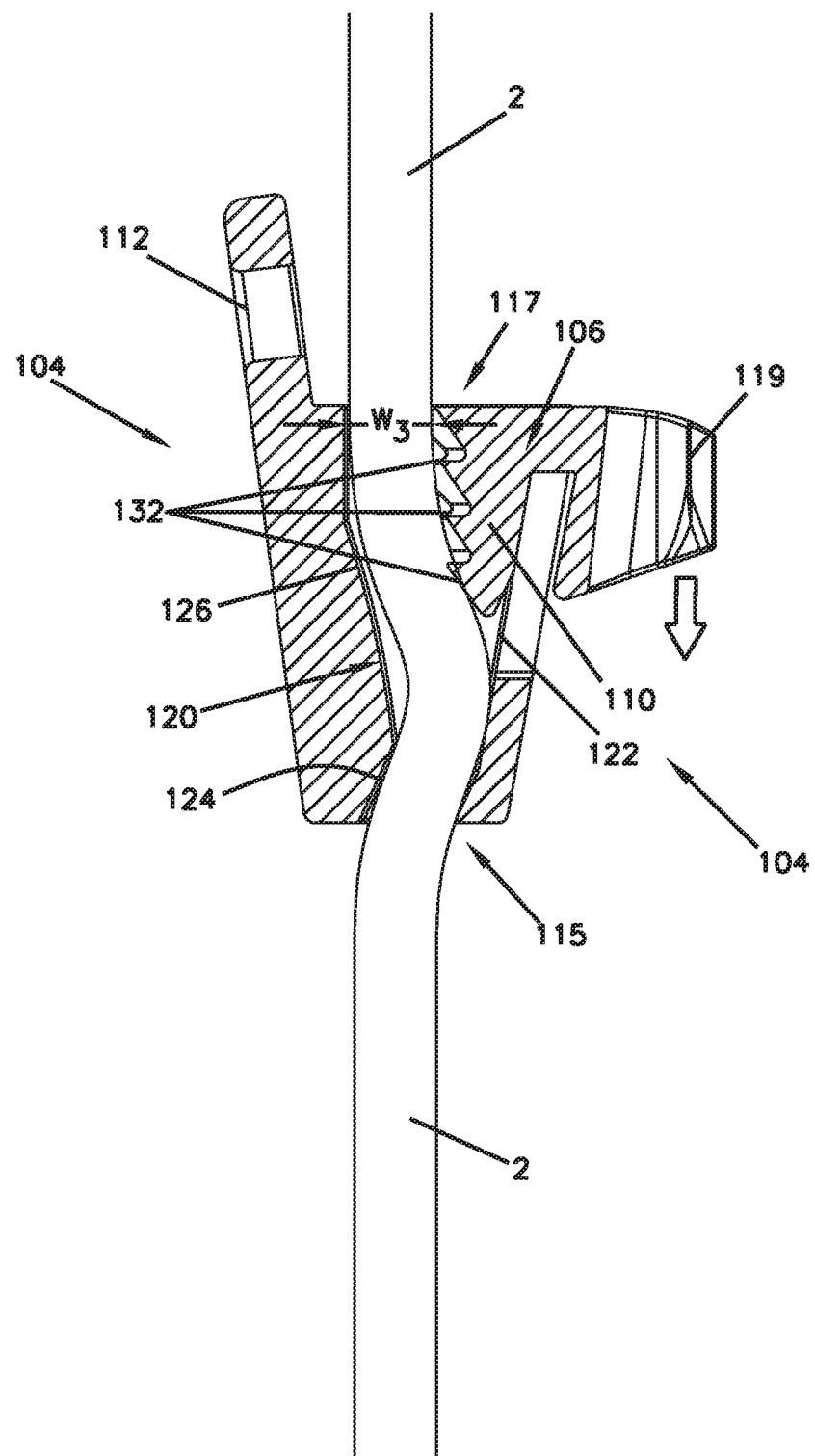
FIG. 14 shows a schematic side cross-sectional view of the bungee fastener of FIG. 11, in the unlocked positon.
Figure 15:
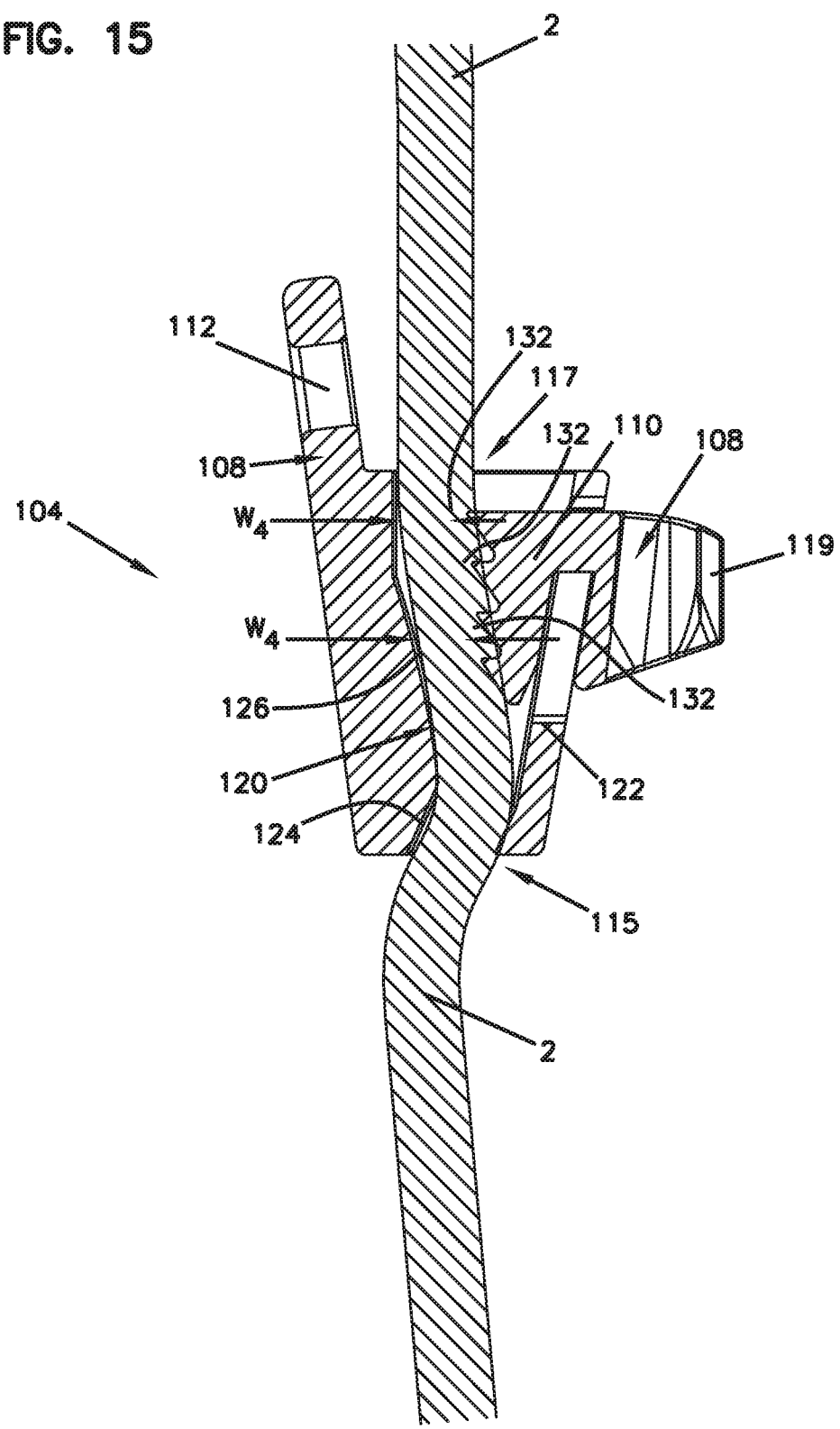
FIG. 15 shows a schematic side cross-sectional view of the bungee fastener of FIG. 11, in the locked positon.
Figure 16:
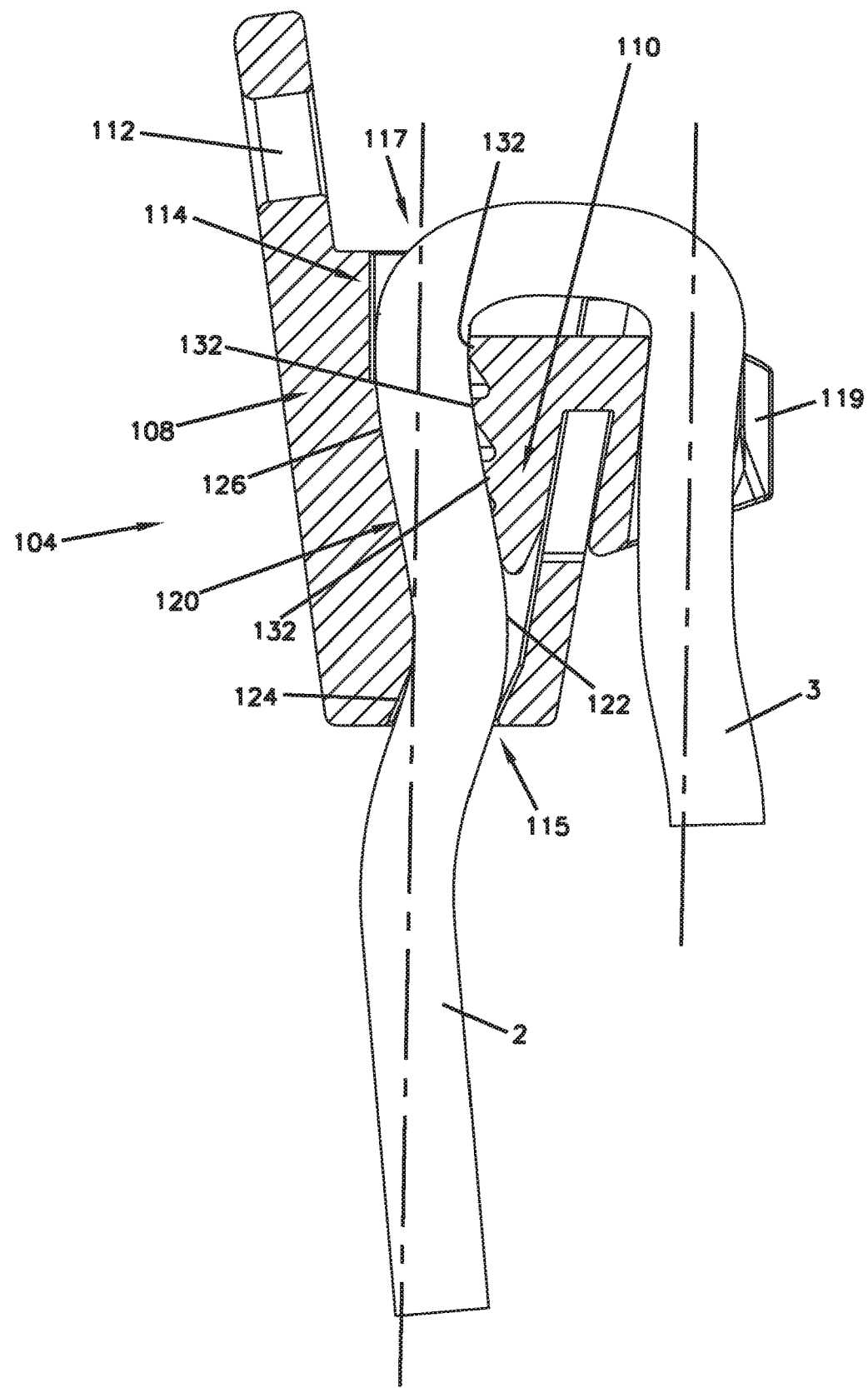
FIG. 16 shows a schematic side cross-sectional view of the bungee fastener of FIG. 11, in the locked positon and a bungee cord tail secured.

FIGS. 14-16 show the position of the bungee 2 within the bungee fastener 104 when moving from an unlocked positioned (FIG. 14) to a locked positioned (FIGS. 15-16). Like the slider 6 described above, the slider 106 includes a plurality of teeth 132 on a wedge-shaped clip 110. The teeth 132 are configured to engage with the bungee 2 within the chute 114 to lock the bungee fastener 104 to the bungee 2.

The chute 114 of the body 108 is shown to a have a generally tapered construction. The chute includes a rear wall 120 and a front wall 122, oppositely positioned to one another within the chute 114. The front wall 122 includes the channel 116 disposed therein. As such, the slider 106, specifically the clip 110, is configured to slide along the front wall 122 of the chute 114 during operation between the unlocked position and the locked position. The rear wall 120 of the chute 114 has a construction that guides the bungee 2 against the teeth 132 of the slider 106. In some examples, the rear wall 120 has a wall construction that is not straight. In some examples, the rear wall 120 is has a meandering wall construction from the bottom side 115 of the body 108 to the top side 117 of the body 108. In some examples, the rear wall 120 has a first portion 124 that slopes in a direction toward the front wall 122 as the first portion 124 extends from the bottom side 115 of the body 108 toward the top side 117 of the body 108. The first portion 124 guides the bungee 2 toward the teeth 132 of the slider 106. In some examples, the rear wall 120 can include a second portion 126 that is sloped differently from the first portion 124. In some examples, the first and second portions 124, 126 have opposite slopes.

Due to the tapered construction of the chute 114 and the wedge shape of the clip 110, the portion of the chute 114 in which the bungee 2 is positioned changes width when the slider 106 is moved between the unlocked to the locked position. When in the unlocked position, as shown in FIG. 14, the chute 114 has a width W3 between the rear wall 120 and the closest tooth 132 of the slider 106. When in the locked position, as shown in FIGS. 15 and 16, the chute 114 has a width W4 between the closest tooth 132 and the rear wall 120. In some examples, width W4 is less than width W3.

As shown in FIG. 16, once positioned in the locked position, the bungee 2 can then optionally be secured to the slider 106 via the fastener 119 disposed on the slider 106. In some examples, the fastener 119 retains the bungee 2 in an orientation so that the portion of the bungee 2 that is not positioned within the chute 114 is positioned generally parallel to the portion of the bungee 2 that is disposed within the chute 114. Such positioning causes generally a 180 degree bend in the bungee 2 adjacent the top side 117 of the body 108 that offers a set of advantages. In one example, such positioning of the bungee 2 within the fastener 119 urges engagement between the teeth 132 and the bungee 2. In another example, when secured in the fastener 119, the bungee 2 is less likely to become dislodged from the locked position, thereby increasing the clamping power of the bungee fastener 104. In other examples still, the fastener 119 offers the user a way to store a tail 3 of the bungee 2 to prevent unwanted movement (i.e., dangling) of the tail 3.

Figure 17:
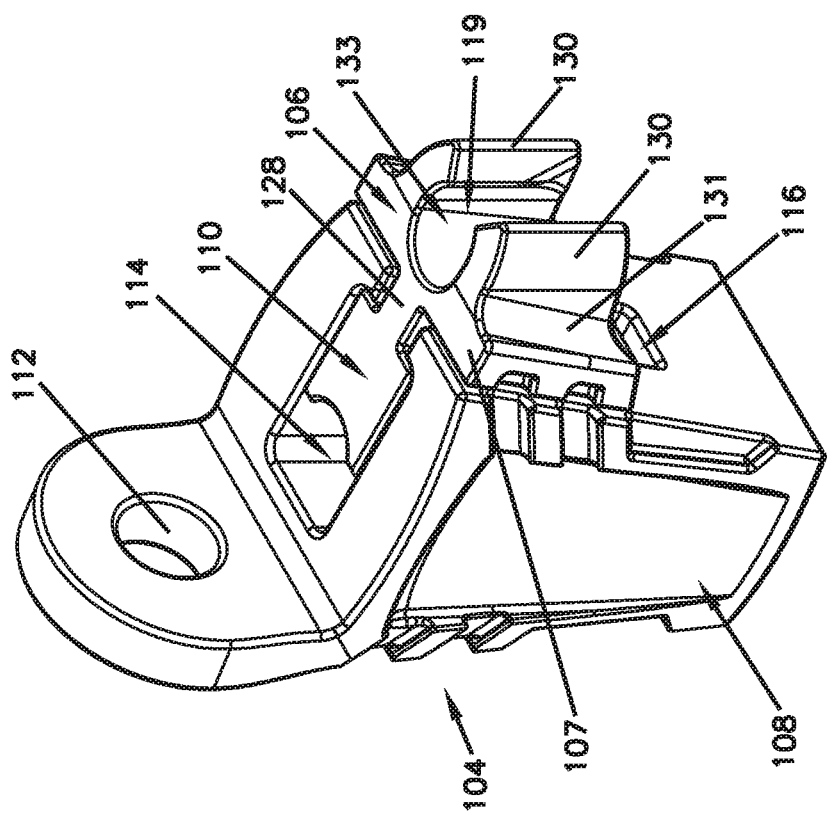
FIG. 17 shows a rear perspective view of the bungee fastener of FIG. 11, without a bungee cord.
Figure 18:
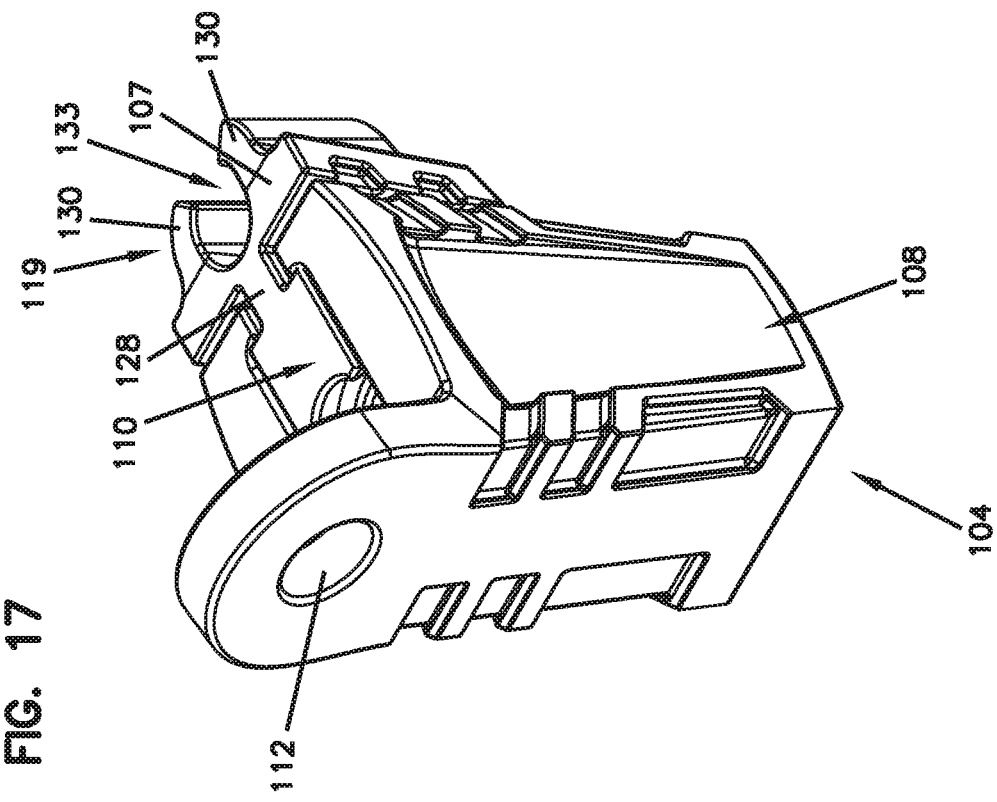
FIG. 18 shows a front perspective view of the bungee fastener of FIG. 11, without a bungee cord.

FIGS. 17 and 18 show perspective views of the bungee fastener 104 without a bungee 2 positioned therein.

As shown, the slider 106 is positioned in the unlocked position within the body 108, specifically within the channel 116. The clip 110 of the slider 106 is connected with a main body 107 of the slider 106 via a neck 128. Similar to the slider 6 above, the neck 128 is configured to be slidably positioned within the channel 116 of the body 108.

The main body 107 of the slider 106 includes the fastener 119 disposed thereon. In some examples, the main body 107 includes a pair of arms 130 that extend away from an outer face 131 of the main body. In some examples, the arms 130 provide a grasping location for the user to interact with the slider 106 to allow the user to move the slider 106 between the locked position and the unlocked position. In some examples, the arms 130 form at least a partial aperture 133. In such an example, the arms 130 and the aperture 133 together form the fastener 119. In some examples, the partial aperture 133 is configured to receive the bungee 2.

Figure 19A:
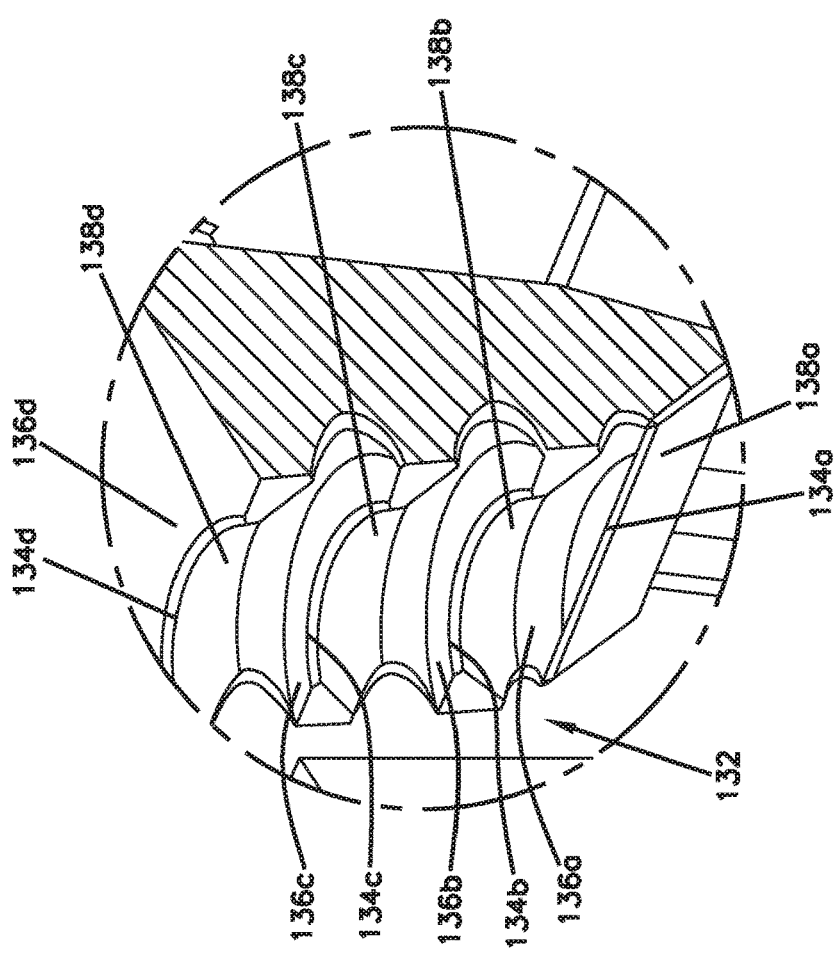
FIG. 19A shows a perspective view of the bungee fastener of FIG. 11, without a bungee cord.
Figure 19B:
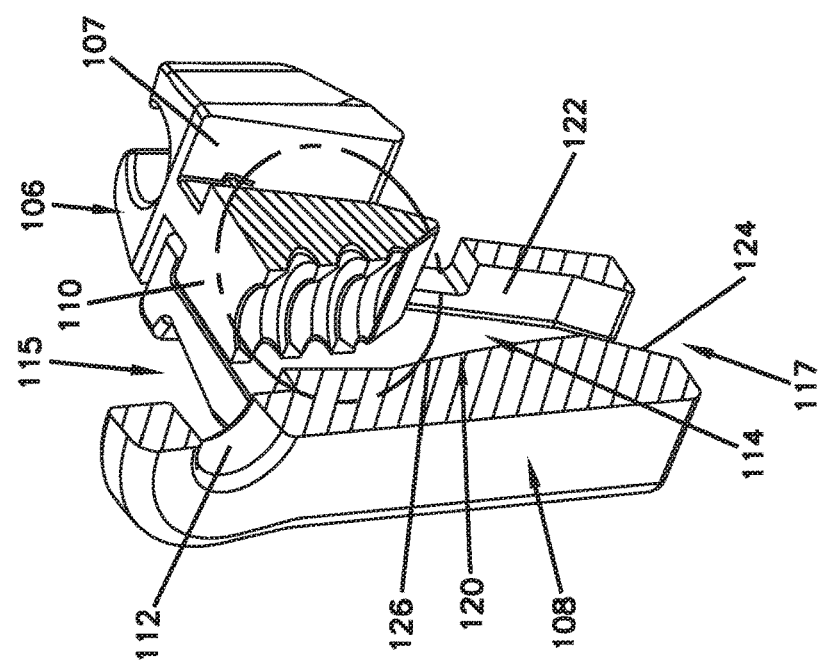
FIG. 19B shows a cutaway perspective view of the bungee fastener of FIG. 19A.

FIG. 19 shows a partial cutaway view of the bungee fastener 104. Specifically, FIG. 19 shows a blown up view of the teeth 132 of the slider 106. In the depicted example, at least some of the teeth 132 have a generally curved construction. Each tooth 132 includes a tooth edge 134, a top surface 136, and a bottom surface 138. The top and bottom surfaces 136, 138 of each tooth 132 extend away from the clip 110 and intersect to form the tooth edges 134a, 134b, 134c, 134d. In some examples, the tooth edges 134 can be smooth edges. In other examples, the tooth edges 134 can be serrated edges. In some examples, only a single tooth edge 134 can have a serrated or smooth edge. In some examples, the tooth edges 134 and top and bottom surfaces 136, 138 of each tooth 132 have a concave curved construction. In some examples, the tooth edges 134 can have a variety of different shapes and constructions. In some examples, the tooth edges 134 all have the same tooth construction. In other examples, at least one of the tooth edges 134 has a different construction than the other tooth edges 134. In the depicted example, the lowermost tooth edge 134a, which is positioned within the chute 114 closest to the bottom side 117 of the body 108, includes a generally straight tooth edge 134a, whiles the other tooth edges 134b, 134c, 134d are generally curved.

Figure 21:
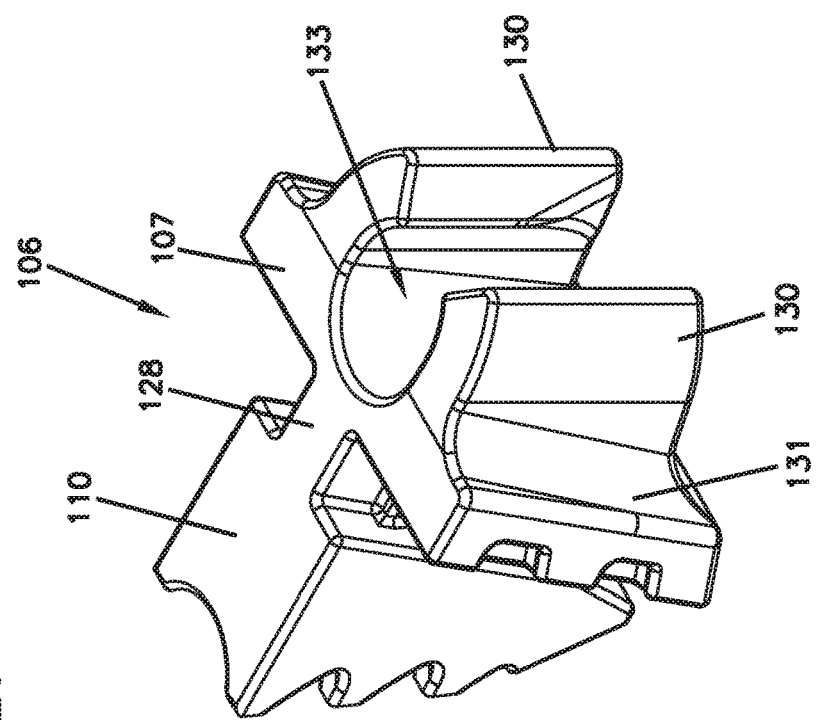
FIG. 21 shows a front perspective view of the slider of FIG. 20.
Figure 20:
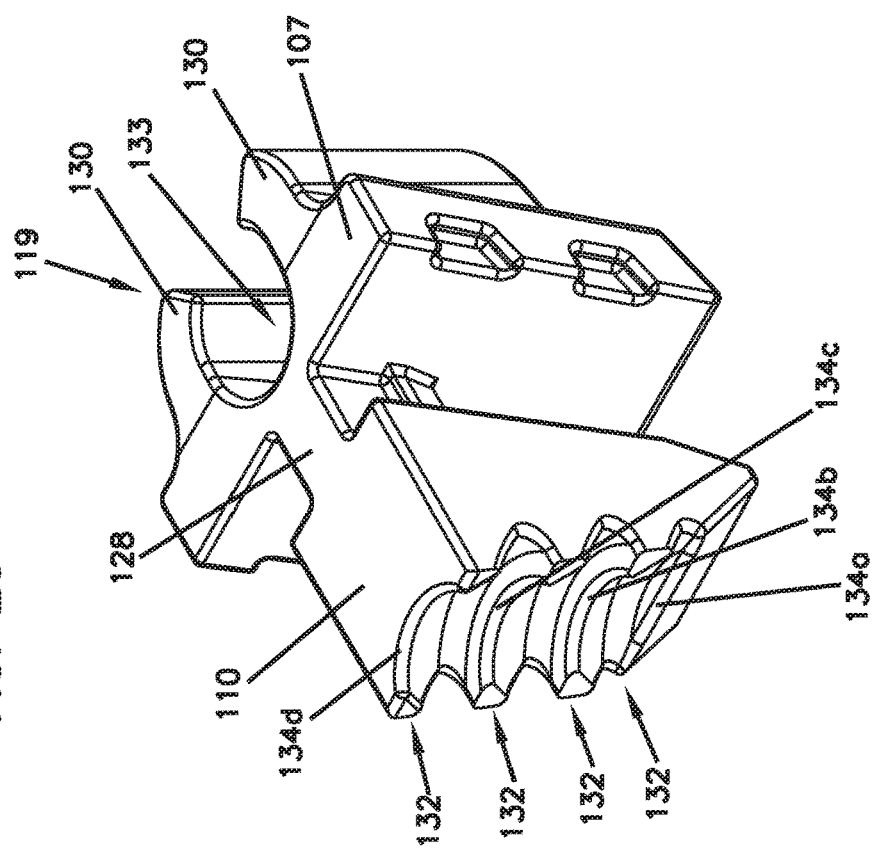
FIG. 20 shows a rear perspective view of a slider, according to one embodiment of the present disclosure.

FIGS. 20-21 show perspective views of the slider 106. FIG. 22 shows a side view of the slider 106. In the depicted embodiment, the clip 110 is shown to have a wedge shape. In some examples, the clip has a front wall surface 140 that is configured to mate with the front wall 122 of the chute 114. The front wall surface 140 defines a reference plane Z. The furthermost edges of the teeth 132 from the front wall surface 140 define a reference plane Y. The reference plane Z and the reference plane Y interest at an angle θ. Angle θ defines the wedge shape of the clip 110. In some examples, angle θ is between about 5 degrees and about 60 degrees. In other examples, angle θ is between about 15 degrees and 30 degrees.

Figure 23:
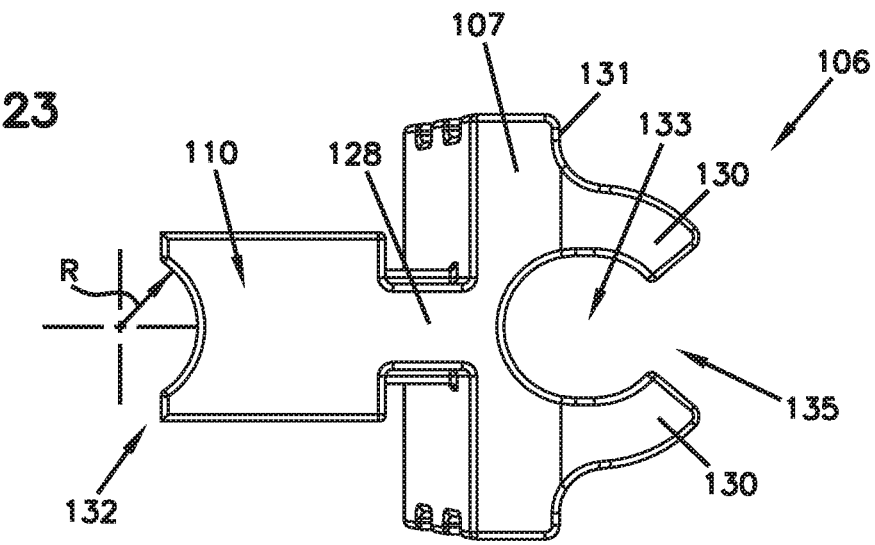
FIG. 23 shows a top view of the slider of FIG. 20.

FIG. 23 shows a top view of the slider 106. As shown, the tooth edge 134d has a radius R. In some examples, the tooth edges 134b and 134c can have the same radius R. Radius R can be of any of a wide range of radii. In some examples, the radius R is substantially similar to a radius of the bungee 2 that is to be positioned within the chute 114. In such an example, the majority of tooth edges 134 are configured to contact the bungee 2 when in the locked positon, thereby increasing the clamping ability of the teeth 132.

The aperture 133 of the fastener 119 is also shown in FIG. 23. In some examples, the arms 130 form an opening 135 therebetween to allow access into the aperture 133. In some examples, the opening 135 is of a size that allows the passage of the bungee 2 into the aperture, but also of a size so that the aperture 133 retains the bungee 2 once positioned there.

Figure 24:
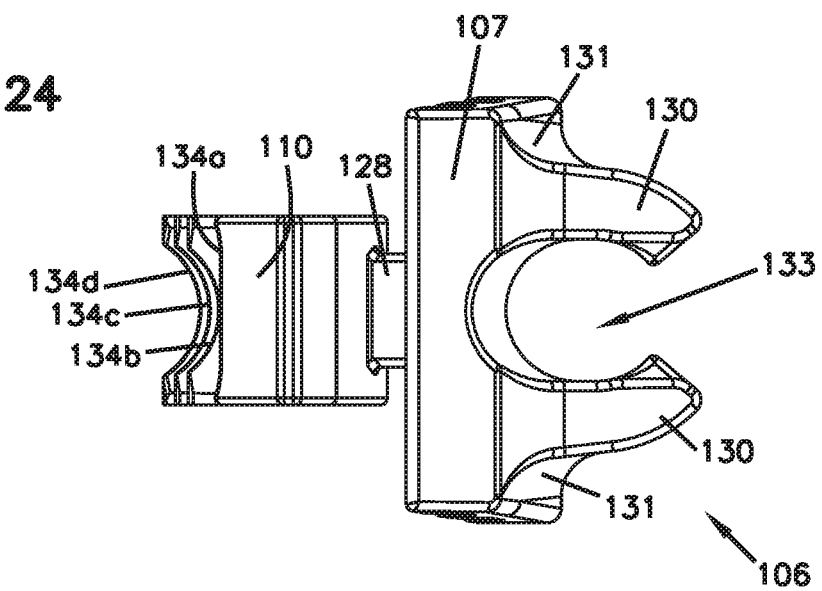
FIG. 24 shows a bottom view of the slider of FIG. 20.

FIG. 24 shows a bottom view of the slider 106. The lowermost tooth edge 134a is shown to be substantially straight while the tooth edges 134b, 134c, and 134c are shown to be substantially curved.

Figure 25:
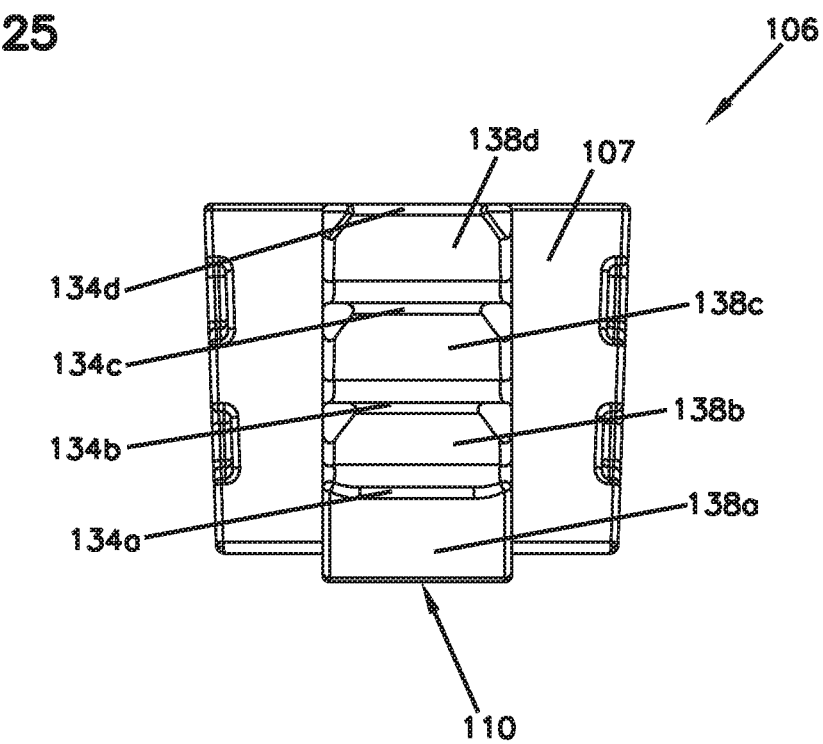
FIG. 25 shows a side view of the slider of FIG. 20.
Figure 26:
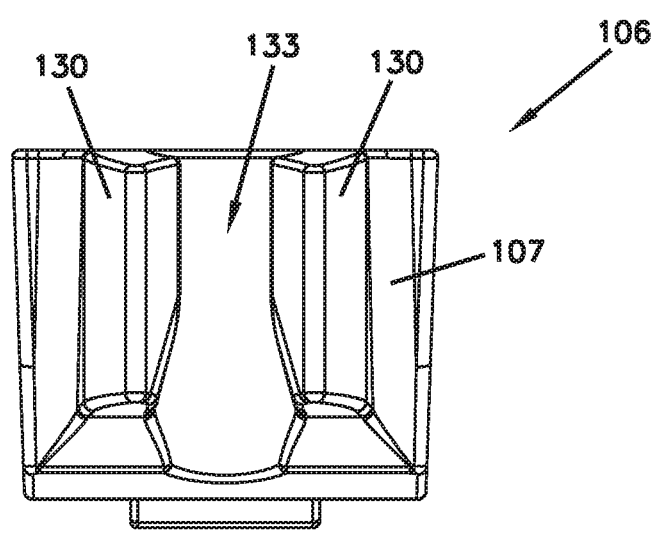
FIG. 26 shows another side view of the slider of FIG. 20.

FIG. 25 shows a front view of the slider 106, and FIG. 26 shows a rear view of the slider 106. As shown, each tooth edge 134 is generally aligned and stacked atop adjacent tooth edges 134. In some examples, the tooth edges 134 can be misaligned.

EXAMPLES

Illustrative examples of the bungee fastener disclosed herein are provided below. An example of the bungee fastener may include any one or more, and any combination of, the examples described below.

Example 1

In combination with, or independent thereof, any example disclosed herein, a bungee fastener includes a body with a tapered chute passing through the body. The bungee fastener includes a slider that is configured for sliding engagement with the body. The bungee fastener includes a clip extending from the slider by a neck. The bungee fastener includes a channel that forms an opening in a side of the body, thereby allowing passage of the neck of the slider through the channel and placing the clip within the tapered chute. The bungee fastener includes a plurality of slider teeth along the clip within the tapered chute. The slider may be slid along the channel thereby selectively enlarging and narrowing the tapered chute with the slider teeth and clip as the slider is slid.

Example 2

In combination with, or independent thereof, any example disclosed herein, a bungee is accepted by the tapered chute when the slider is in an unlocked position, and the bungee fastener is freely moved along a length of the bungee while the slider is kept in the unlocked position.

Example 3

In combination with, or independent thereof, any example disclosed herein, the bungee fastener is locked onto the bungee when the slider is slid along the channel into a locked position, thereby narrowing the tapered chute and causing a pressure on the bungee by the slider teeth and the tapered chute against the bungee.

Example 4

In combination with, or independent thereof, any example disclosed herein, the bungee fastener is unlocked from the bungee when the slider is moved back to the unlocked position, thereby enlarging the tapered chute and releasing the pressure on the bungee from the slider teeth and the tapered chute.

Example 5

In combination with, or independent thereof, any example disclosed herein, the bungee includes both elastic and non-elastic rope, cords, and wires.

Example 6

In combination with, or independent thereof, any example disclosed herein, a bungee fastener includes a body with a tapered chute passing through the body. The bungee fastener includes a first slider that is configured for sliding engagement with the body within the tapered chute. The bungee fastener includes a first clip that extends from the first slider by a first neck into the tapered chute. The bungee fastener includes a first channel that forms a first opening in a side of the body, thereby allowing passage of the first neck of the first slider through the first channel and placing the first clip within the tapered chute. The bungee fastener includes a plurality of slider teeth along the first clip within the tapered chute. The first slider may be slid along the channel, thereby selectively enlarging and narrowing the tapered chute with the first slider teeth and first clip as the first slider is slid.

Example 7

In combination with, or independent thereof, any example disclosed herein, the bungee fastener includes a second slider that is configured for sliding engagement with the body, opposite the first slider, within the tapered chute. The bungee fastener includes a second clip that extends from the second slider by a second neck into the tapered chute. The bungee fastener includes a second channel that forms a second opening in a second side of the body, thereby allowing passage of the second neck of the second slider through the second channel and placing the second clip within the tapered chute. The bungee fastener includes a plurality of slider teeth along the second clip within the tapered chute. The first slider and the second slider engage one another within the tapered chute with arm extensions, and each one of the first and second sliders may be slid along their respective channels, thereby selectively enlarging and narrowing the tapered chute with the first and second slider teeth.

Example 8

In combination with, or independent thereof, any example disclosed herein, a bungee is accepted by the tapered chute when the first and second sliders are in an unlocked position, and the bungee fastener is freely moved along a length of the bungee while the first and second sliders are kept in the unlocked position.

Example 9

In combination with, or independent thereof, any example disclosed herein, the bungee fastener is locked onto the bungee when the first and second sliders are slid along their respective first and second channels into a locked position, thereby narrowing the tapered chute and causing a pressure on the bungee by the slider teeth from each respective slider.

Example 10

In combination with, or independent thereof, any example disclosed herein, the bungee fastener is unlocked from the bungee when the first and second sliders are moved back to the unlocked position, thereby enlarging the tapered chute and releasing the pressure on the bungee from the slider teeth.

Example 11

In combination with, or independent thereof, any example disclosed herein, the bungee includes both elastic and non-elastic rope, cords, and wires.

Example 12

In combination with, or independent thereof, any example disclosed herein, the arm extensions interlock the first and second sliders such that movement of the first slider along the first channel urges the second slider to likewise move along the second channel.

Example 13

In combination with, or independent thereof, any example disclosed herein, a bungee fastener includes a body that has a top side and an opposite bottom side, the body defining a tapered chute that is configured to receive a cord. The bungee fastener includes a slider at least partially positioned within the tapered chute. The slider is movable relative to the body within the tapered chute between the top side and bottom side of the body. The slider includes a plurality of teeth positioned within the tapered chute.

Example 14

In combination with, or independent thereof, any example disclosed herein, the slider includes a clip body and a main body. The clip body extends from the main body by way of a neck, and the clip body is positioned within the tapered chute.

Example 15

In combination with, or independent thereof, any example disclosed herein, the slider is at least partially positioned within a channel defined by the body in a wall of the tapered chute. The channel is sized and shaped to receive the neck of the slider.

Example 16

In combination with, or independent thereof, any example disclosed herein, the plurality of teeth are disposed on the clip body, and when the slider is moved relative to the body, a width of the tapered chute is selectively enlarged or narrowed by way of the teeth.

Example 17

In combination with, or independent thereof, any example disclosed herein, at least one of the plurality of teeth has a generally curved construction, and the at least one of the plurality of teeth has a radius.

Example 18

In combination with, or independent thereof, any example disclosed herein, at least one of the plurality of teeth has a generally straight construction, and the at least one of the plurality of teeth has a radius.

Example 19

In combination with, or independent thereof, any example disclosed herein, the tapered chute has a front wall and a rear wall. The front wall is configured to contact the slider.

Example 20

In combination with, or independent thereof, any example disclosed herein, the rear wall has at least one portion that is sloped toward the front wall as the portion extends from the bottom side of the body toward the top side of the body.

Example 21

In combination with, or independent thereof, any example disclosed herein, the slider includes a fastener positioned outside of the tapered chute. The bungee fastener is configured to receive and secure a portion of a cord.

Example 22

In combination with, or independent thereof, any example disclosed herein, the slider includes a pair of arms that define a partial aperture. The aperture is sized and shaped to receive a portion of a cord.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A bungee cord fastener comprising:
   a body with a tapered chute passing through the body;
   a bungee cord tail fastener positioned outside the tapered chute;
   a channel forming an opening extending from a side of the body into the tapered chute;
   a slider configured for sliding engagement with the body; and
   a clip positioned within the tapered chute and attached to the slider by a neck extending through the channel;
   wherein the slider may be slid along the channel to adjust a position of the clip within the tapered chute, thereby selectively enlarging and narrowing a passage through the tapered chute.

2. The bungee cord fastener of claim 1, wherein the tapered chute extends through the body from a wider end to a narrower end, and wherein the channel extends along a side of the body from an opening at the wider end.

3. The bungee cord fastener of claim 2, further comprising a throat formed in the body at the opening of the channel, the throat protruding from the body and preventing the neck from exiting the channel in a direction toward the wider end.

4. The bungee cord fastener of claim 2, wherein the body further includes an eyelet formed in a portion of the body extending past the wider end of the tapered chute.

5. The bungee cord fastener of claim 1, wherein the tapered chute includes one or more teeth formed on an interior surface of the body within the tapered chute.

6. The bungee cord fastener of claim 1, wherein the bungee cord tail fastener is formed on an outer surface of the slider.

7. The bungee cord fastener of claim 1, wherein the clip includes a plurality of slider teeth.

8. A cord fastener comprising:
   a body having a first end and a second end, the first end having an opening and the second end including an attachment mechanism, the attachment mechanism being at least one of a hook or a carabiner;
   a chute extending from the opening at the first end toward the second end, the chute defining a cord passage between the opening at the first end and a second cable opening;
   a channel formed in the body along the chute;
   a clip positioned within the chute and including a plurality of clip teeth oriented away from the channel and toward an opposing side of the chute for engagement with a cord positioned within the chute; and
   a manual engagement mechanism connected to the clip via a neck positioned within the channel, the manual engagement mechanism being positioned outside the body and movable along the body to adjust a position of the clip within the chute, thereby selectively enlarging and narrowing the cord passage through the chute.

9. The cord fastener of claim 8, wherein the attachment mechanism comprises a carabiner.

10. The cord fastener of claim 9, wherein the carabiner is attached to the body via an eyelet formed in the body at the second end.

11. The cord fastener of claim 8, wherein the chute is tapered from the second end toward the first end.

12. The cord fastener of claim 8, wherein the manual engagement mechanism comprises a slider.

13. The cord fastener of claim 8, further comprising a bungee cord tail fastener positioned outside the chute.

14. The cord fastener of claim 8, further comprising the cord being positioned within the chute.

15. The cord fastener of claim 14, wherein the cord comprises a bungee cord.

16. The cord fastener of claim 8, wherein at least one of the plurality of clip teeth has a generally curved construction, and wherein the at least one of the plurality of clip teeth has a radius.

17. The cord fastener of claim 8, wherein at least one of the plurality of clip teeth has a generally straight construction.

18. The cord fastener of claim 8, wherein the clip is movable between a cord engagement position and a disengagement position, and wherein a cord is accepted by the chute when the clip is in the disengagement position such that the cord fastener is freely movable along a length of the cord while the clip is kept in the disengagement position.

19. The cord fastener of claim 18, wherein the cord fastener is locked onto the cord when the clip is moved to the cord engagement position within the chute, thereby narrowing the chute and causing a pressure on the cord by the clip teeth and the chute against the cord.

20. The cord fastener of claim 19, wherein the chute comprises a tapered chute and the manual engagement mechanism comprises a slider that is slidable along the body to move the clip between the cord engagement position and the disengagement position.

\* \* \* \* \*